United States Patent
Klosowski et al.

(10) Patent No.: US 7,422,791 B2
(45) Date of Patent: Sep. 9, 2008

(54) JOINT ASSEMBLIES, METHODS FOR INSTALLING JOINT ASSEMBLIES, AND JOINTING COMPOSITIONS

(75) Inventors: Jerome M. Klosowski, Bay City, MI (US); Gary Wentworth, Chicago, IL (US); Zhi Chen, Wynnewood, PA (US); Stephen Semlow, Homer Glen, IL (US); Stephen O'Rourke, Bolingbrook, IL (US); Kimberly L. Stefanisin, Oak Lawn, IL (US); John English, Oak Lawn, IL (US)

(73) Assignee: Hallstar Innovations Corp., Chicago, IL (US)

( * ) Notice: Subject to any disclaimer, the term of this patent is extended or adjusted under 35 U.S.C. 154(b) by 681 days.

(21) Appl. No.: 11/018,790

(22) Filed: Dec. 20, 2004

(65) Prior Publication Data
US 2005/0194752 A1 Sep. 8, 2005

Related U.S. Application Data

(63) Continuation-in-part of application No. 10/718,233, filed on Nov. 19, 2003, now Pat. No. 7,144,937.

(51) Int. Cl.
*B32B 17/10* (2006.01)
(52) U.S. Cl. .................. 428/436; 428/441; 428/460; 428/461; 428/462; 428/489; 428/494; 428/495; 524/100; 524/306; 524/311; 524/315
(58) Field of Classification Search .................. 428/436, 428/441, 460, 461, 462, 489, 494, 495
See application file for complete search history.

(56) References Cited

U.S. PATENT DOCUMENTS

| | | | |
|---|---|---|---|
| 2,940,949 A | 6/1960 | Mullin et al. | 260/31.4 |
| 3,256,362 A | 6/1966 | Craubner et al. | 260/862 |
| 3,435,012 A | 3/1969 | Nordlander | 260/88.3 |
| 3,654,007 A | 4/1972 | Winstanley et al. | 156/132 |
| 3,825,515 A | 7/1974 | Lucas et al. | 260/31.8 M |
| 3,888,813 A | 6/1975 | Moult et al. | 260/343 |
| 3,951,887 A | 4/1976 | Tanimura et al. | 260/3 |
| 3,968,198 A | 7/1976 | Honda et al. | 264/343 |
| 3,968,295 A | 7/1976 | Solomon | 428/250 |
| 3,991,025 A | 11/1976 | Kutch et al. | 260/24 |
| 3,993,847 A | 11/1976 | Kondo | 428/451 |
| 4,016,119 A | 4/1977 | Elmer | 260/17.5 |
| 4,025,454 A | 5/1977 | Rouzier | 252/182 |
| 4,026,744 A | 5/1977 | Elmer | 156/110 A |

(Continued)

FOREIGN PATENT DOCUMENTS

CA 2 408 772 4/2003

(Continued)

OTHER PUBLICATIONS

Mechanics of Pneumatic Tires, Clark, National Bureau of Standards Monograph 112, U.S. Dept. of Commerce, pp. 241-243 and 290-291 (Nov. 1971).

(Continued)

*Primary Examiner*—Bernard Lipman
(74) *Attorney, Agent, or Firm*—Marshall, Gerstein & Borun LLP

(57) ABSTRACT

The invention is directed to joint assemblies comprising at least two adjacent panels and a jointing composition adhering to and positioned between the at least two adjacent panels, methods for installing joint assemblies, and jointing compositions. The jointing compositions include a sealant composition and a long chain ester in an amount of about 0.1% to about 15% by weight, based on the weight of the sealant composition in the jointing composition.

52 Claims, 6 Drawing Sheets

U.S. PATENT DOCUMENTS

| | | | |
|---|---|---|---|
| 4,038,220 A | 7/1977 | Thompson | 260/3 |
| 4,054,561 A | 10/1977 | Strauss et al. | 260/22 D |
| 4,061,835 A | 12/1977 | Poppe et al. | 428/522 |
| 4,078,114 A | 3/1978 | Aronoff et al. | 428/379 |
| 4,130,535 A | 12/1978 | Coran et al. | 260/33.6 AQ |
| 4,134,869 A | 1/1979 | Kalafus et al. | 260/29.3 |
| 4,317,755 A | 3/1982 | Gregory | 524/276 |
| 4,376,711 A | 3/1983 | Shaub | 252/32.7 E |
| 4,435,477 A | 3/1984 | Davis | 428/462 |
| 4,448,813 A | 5/1984 | Solomon | 427/381 |
| 4,469,748 A | 9/1984 | Sharma | 428/378 |
| 4,472,463 A | 9/1984 | Solomon | 427/381 |
| 4,472,537 A | 9/1984 | Johnson et al. | 523/160 |
| 4,521,558 A | 6/1985 | Mowdood | 524/145 |
| 4,532,080 A | 7/1985 | Delseth et al. | 556/139 |
| 4,550,147 A | 10/1985 | Oohara | 525/332.6 |
| 4,574,142 A | 3/1986 | Charnock | 525/305 |
| 4,588,761 A | 5/1986 | Thoma et al. | 524/38 |
| 4,605,590 A | 8/1986 | Delseth et al. | 428/295 |
| 4,605,693 A | 8/1986 | Mowdood | 524/239 |
| 4,645,788 A | 2/1987 | Okumoto et al. | 524/308 |
| 4,681,961 A | 7/1987 | Zerpner et al. | 556/428 |
| 4,683,250 A | 7/1987 | Mikami | 522/33 |
| 4,699,792 A | 10/1987 | Nick et al. | 424/446 |
| 4,704,334 A | 11/1987 | Delseth et al. | 428/458 |
| 4,772,675 A | 9/1988 | Klosowski et al. | 528/15 |
| 4,776,909 A | 10/1988 | Bohm et al. | 156/117 |
| 4,785,033 A | 11/1988 | Mowdood | 524/86 |
| 4,789,381 A | 12/1988 | Oshiyama et al. | 8/115.6 |
| 4,797,446 A | 1/1989 | Dietlein et al. | 524/860 |
| 4,859,215 A | 8/1989 | Langsam et al. | 55/16 |
| 4,871,827 A | 10/1989 | Klosowski et al. | 528/17 |
| 4,888,404 A | 12/1989 | Klosowski et al. | 528/15 |
| 4,898,910 A | 2/1990 | Kamis et al. | 524/860 |
| 4,978,392 A | 12/1990 | Kilbarger et al. | 106/95 |
| 4,978,716 A | 12/1990 | Flynn et al. | 525/195 |
| 5,057,566 A | 10/1991 | Kobayashi et al. | 524/297 |
| 5,107,069 A | 4/1992 | Wichelhaus et al. | 524/314 |
| 5,169,716 A | 12/1992 | Croft et al. | 428/379 |
| 5,185,189 A | 2/1993 | Stenger et al. | 428/34.8 |
| 5,226,987 A | 7/1993 | Matsumoto et al. | 152/209 R |
| 5,246,051 A | 9/1993 | Inada et al. | 152/527 |
| 5,253,691 A | 10/1993 | Scriver | 152/537 |
| 5,290,886 A | 3/1994 | Ellul | 524/515 |
| 5,298,539 A | 3/1994 | Singh et al. | 524/92 |
| 5,357,025 A | 10/1994 | Altes et al. | 528/42 |
| 5,428,089 A | 6/1995 | Ishikawa et al. | 524/188 |
| 5,447,776 A | 9/1995 | Disselbeck | 428/178 |
| 5,455,075 A | 10/1995 | Longo | 427/398.1 |
| 5,492,728 A | 2/1996 | Carbary et al. | 427/314 |
| 5,565,541 A | 10/1996 | Carbary et al. | 528/17 |
| 5,571,352 A | 11/1996 | Disselbeck | 152/526 |
| 5,604,277 A | 2/1997 | Osborn | 524/270 |
| 5,605,955 A | 2/1997 | Hirai | 524/588 |
| 5,616,657 A | 4/1997 | Imamura et al. | 525/437 |
| 5,792,805 A | 8/1998 | Williams | 524/100 |
| 5,834,582 A | 11/1998 | Sinclair et al. | 528/354 |
| 5,891,938 A | 4/1999 | Williams | 524/100 |
| 5,900,448 A | 5/1999 | Wideman et al. | 524/419 |
| 5,973,045 A | 10/1999 | Dowling et al. | 524/270 |
| 5,985,963 A | 11/1999 | D'Sidocky et al. | 524/105 |
| 6,127,512 A | 10/2000 | Asrar et al. | 528/272 |
| 6,138,731 A | 10/2000 | Miyazaki et al. | 152/532 |
| 6,211,262 B1 | 4/2001 | Mejiritski et al. | 522/71 |
| 6,255,367 B1 | 7/2001 | Bitler et al. | 523/522 |
| 6,262,180 B1 | 7/2001 | Klun et al. | 525/199 |
| 6,326,426 B1 | 12/2001 | Ellul | 524/270 |
| 6,423,767 B1 | 7/2002 | Weber et al. | 524/158 |
| 6,429,244 B1 | 8/2002 | Rinka et al. | 524/186 |
| 7,317,051 B2 * | 1/2008 | Georgeau et al. | 524/837 |
| 2002/0010275 A1 | 1/2002 | Maly et al. | 525/177 |
| 2003/0171471 A1 | 9/2003 | Pritschins et al. | 524/306 |

FOREIGN PATENT DOCUMENTS

| | | |
|---|---|---|
| EP | 0 073 174 A1 | 3/1983 |
| EP | 0 450 105 A1 | 3/1990 |
| EP | 0 704 491 | 4/1996 |
| EP | 1 022 306 A1 | 7/2000 |
| EP | 1 304 210 A1 | 4/2003 |
| FR | 2 417 522 | 9/1979 |
| GB | 1 045 577 | 10/1966 |
| GB | 2 022 089 | 12/1979 |
| JP | 06223316 | 4/1996 |
| WO | WO 03/095550 A1 | 11/2003 |

OTHER PUBLICATIONS

Peterson et al., Resorcinol Bonding Systems for Steel Cord Adhesion, Rubber World, pp. 24-27 (Aug. 1984).

* cited by examiner

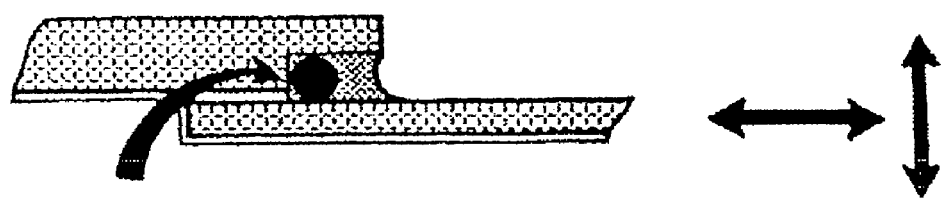
FIGURE 3.A
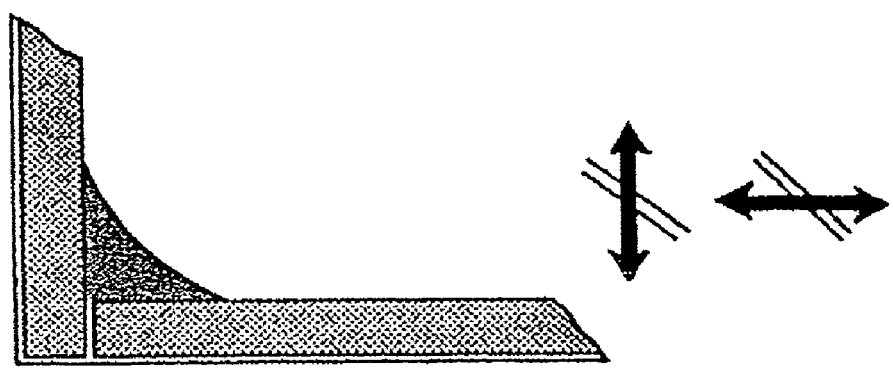
FIGURE 3.B
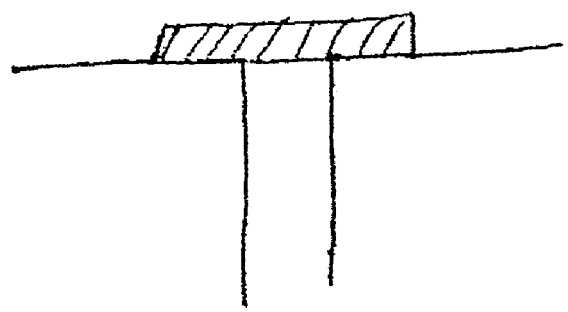
FIGURE 3.C

JOINT ASSEMBLIES, METHODS FOR INSTALLING JOINT ASSEMBLIES, AND JOINTING COMPOSITIONS

CROSS REFERENCE TO RELATED APPLICATIONS

This is a continuation-in-part of U.S. patent application Ser. No. 10/718,233 filed Nov. 19, 2003 the entire respective disclosure of which is hereby incorporated by reference.

FIELD OF THE INVENTION

The invention is generally related to joint assemblies, methods for installing joint assemblies, and jointing compositions for use in joint assemblies.

BACKGROUND OF THE INVENTION

Joint assemblies are most often found between adjacent panels or sections of transportation and building structures such as pedestrian walkways (e.g., sidewalks), highways, airport runways, bridges, parking garages, parking lots, architectural and building (exterior and interior) facades, roofing, gutters, and other similar structural elements. Joint assemblies are designed and installed to (1) enable the adjacent panels (or sections) to expand and contract without cracking, (2) prevent water, debris, and the like from entering between (and thereby causing deterioration of) the adjacent panels, and (3) maintain a durable, smooth, substantially continuous surface between the adjacent panels being joined by the joint assembly. Proper installation of joint assemblies therefore provides many benefits including but not limited to 'sealing' the structures from the elements and reducing heating and cooling costs. Because of these benefits, joint assemblies are widely used in modern construction.

A joint assembly is usually filled with a sealant composition capable of adhering to the walls of the adjacent structural panels ("adhesion" or "adhesive strength") and of withstanding at least the expected recurring movement of adjacent structural panels relative to one another for a given period of time ("expected joint assembly movement"). Joint assembly movement is typically caused by thermal expansion, but other factors including but not limited to swelling with moisture, wind sway, and vibrations, contribute to the expected joint assembly movement.

The "movement ability" of the sealant composition allows the sealant composition to absorb the expected joint assembly movement. If a sealant composition has a small movement ability, then the joint assembly panels have to be smaller and more joint assemblies will be needed so that the expected joint assembly movement does not exceed the sealant's movement ability. The movement ability is typically expressed as a percentage of the joint assembly width. In contrast, when a sealant composition has a larger movement capability, buildings can be designed with larger panels, or smaller more attractive joint assemblies, or construction variances can be larger and more forgiving, making construction faster and more economical.

Sealant compositions typically have a gelatinous-type consistency (at least initially) which permits easy application between adjacent panels. Preferably, the sealant composition cures in-situ to form an elastomeric-type material. A wide variety of sealant compositions have been developed, including silicone sealant compositions, butyl rubber sealant compositions, acrylic sealant compositions, urethane sealant compositions, and modified urethane sealant compositions. Such sealant compositions generally include a polymer having a molecular weight low enough for ease of application and a curing agent which causes cross-linkages to form between the low molecular weight polymers (preferably, after application of the sealant composition), thereby resulting in the formation of a cross-linked/branched polymeric material in-situ.

In most joint assemblies, the cohesive strength of a sealant composition is not an important factor, particularly in pure sealing applications. In fact, high sealant composition cohesive strength can be detrimental if the surfaces of the adjacent panels being joined by the joint assembly are weak.

On the other hand, however, high sealant composition strength (adhesive and cohesive) is desirable in structural glazing applications where the sealant composition is essentially a flexible glue which both holds the glass panel in a building (or other structure) and keeps the weather out. Given the environmental conditions (e.g., high winds and large temperature changes) encountered in many structural glazing applications, at least some joint assembly movement capability is required.

Modulus is the ratio of stress to strain, and a lower modulus sealant composition with higher movement ability is generally more desirable than higher cohesive strength in joint assembly applications. As a joint assembly moves, the sealant composition in the joint assembly is stretched and exerts a force on the bond line (of the adjacent panels). If the sealant composition is too stiff, the force created by a large movement will be large, and thus weak surfaces can be pulled apart and strong surfaces often see a bond break since the force created will be greater then the adhesive strength of the sealant composition bond to the panel. Conversely, the adjacent panel surfaces of joint assemblies which include lower modulus sealant compositions experience less stress during joint movement. If the sealant composition has a large movement ability and exerts a very low force with movement ("a low modulus, high elongation sealant composition"), the sealant composition will have a better chance of successfully handling the movement and keeping the bond intact. Moreover, joint assemblies including lower modulus, high elongation sealant compositions often are able to satisfy any required joint movement for relatively greater periods of time because these products produce less fatiguing stress (i.e., less force is created during joint assembly movement).

Despite the widespread application of joint assemblies, however, their importance is often not fully appreciated -unless joint assembly failure occurs. Joint assembly failure often causes property damage, and is often attributed to joint assemblies lacking in durability, i.e., joint assemblies which cease to be effective after a short period of time. For example, when the joint assemblies in a building structure (such as concrete panels) deteriorate such that they cannot prevent water from entering, the interior walls of a building become discolored and/or the building contents become soiled. Such deteriorated building structure joint assemblies can also significantly increase heating and cooling costs. Water ingress through failed joint assemblies is also an important cause of mold growth and sick building syndrome. Additionally, when the joint assemblies between adjacent concrete slabs of a transportation structure (such as a highway) fail, they often do so by allowing debris (incompressibles) to enter. Water can then enter the transportation joint assembly and get below the slabs, deteriorate the base (e.g., sand), and cause the slab to crack and break. The deterioration and failure of such transportation structure joint assemblies often further results in gap formation between the adjacent slabs, which causes inconvenience and discomfort to vehicular and pedestrian traffic. Such transportation and building structure joint assemblies often fail because their sealant compositions do not have the requisite low modulus and movement ability to satisfy the expected joint assembly movement.

Therefore, performance improvements in joint assemblies and methods of installing same are still being sought. Similarly, improved sealant compositions for use in joint assemblies are desired.

SUMMARY OF THE INVENTION

The combination of a sealant composition and a long chain ester unexpectedly provides a jointing composition having a decreased modulus of elasticity and high elongation (i.e., movement ability). Therefore, the jointing composition is capable of increased movement ability. Advantageously, such a jointing composition is also typically capable of at least maintaining the adhesive interactions between the jointing composition and any adjacent structural panels. The jointing compositions may therefore be used to provide narrower joint assemblies and/or joint assemblies including wider panels because a smaller amount of the jointing compositions is needed to handle the expected joint movement. Furthermore, the joint assemblies including the jointing compositions are more tolerant of construction variances.

The sealant composition may be a urethane including but not limited to a one-component urethane, a two-component urethane, and a modified urethane. The long chain esters are typically formed by reacting mono-, di-, and/or tri-carboxylic acids containing one, two, or three $C_6C_{24}$ long chain radicals or fatty acid residues, and alcohols containing a $C_3C_{24}$ alkyl group.

One embodiment of the invention provides joint assemblies comprising at least two adjacent structural panels and a jointing composition adhering to and positioned between the at least two adjacent structural panels, said jointing composition including a sealant composition and a long chain ester. In some embodiments, the jointing composition further preferably includes an adhesive resin. The adhesive resin can be any adhesive resin including but not limited to a phenol-formaldehyde resin and a melanine-formaldehyde resin.

Another embodiment of the invention provides methods of making joint assemblies comprising positioning two structural panels adjacent each other so as to define a space therebetween and filling the space with a jointing composition, said jointing composition including a sealant composition and a long chain ester. In some embodiments, the jointing composition further preferably includes an adhesive resin. The adhesive resin can be any adhesive resin including but not limited to a phenol-formaldehyde resin and a melamine-formaldehyde resin.

In a further embodiment, the invention provides jointing compositions comprising a sealant composition and a long chain ester. In some embodiments, the jointing composition further preferably includes an adhesive resin. The long chain ester is preferably dispersed throughout the jointing composition. The adhesive resin is also preferably dispersed throughout the jointing composition. The adhesive resin can be any adhesive resin including but not limited to a phenol-formaldehyde resin and a melamine-formaldehyde resin.

In yet another embodiment, the invention provides methods of decreasing the modulus of elasticity and increasing the elongation of jointing compositions comprising adding a long chain ester to a sealant composition and dispersing the long chain ester throughout the sealant composition to form a jointing composition having a decreased modulus of elasticity and an increased elongation (relative to the sealant composition alone). In some embodiments, the jointing composition further preferably includes an adhesive resin. The adhesive resin is preferably dispersed throughout the jointing composition. The adhesive resin can be any adhesive resin including but not limited to a phenol-formaldehyde resin and a melamine-formaldehyde resin.

BRIEF DESCRIPTION OF THE DRAWINGS

Exemplary aspects and features of jointing compositions and joint assemblies in accordance with the invention are described and explained in greater detail below with the aid of the drawing figures in which:

FIGS. 3A, 3B, and 3C illustrate additional exemplary joint assemblies;

DETAILED DESCRIPTION OF THE INVENTION

Figure 1:
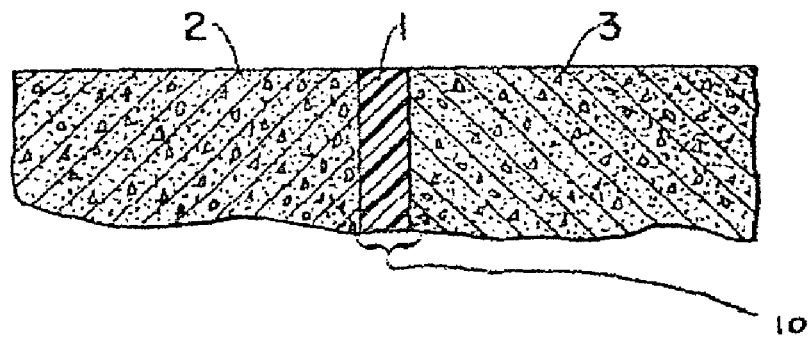
FIG. 1 is a fragmentary cross sectional view of an exemplary joint assembly.

The combination of a long chain ester and a sealant composition unexpectedly provides a jointing composition having a decreased modulus of elasticity (often referenced simply as "modulus") and higher elongation relative to comparable sealant compositions. Advantageously, a joint assembly comprising such a jointing composition is typically capable of at least maintaining and preferably increasing the strength of the adhesive interactions ("adhesion") between the jointing composition and any adjacent structural panels while demonstrating a significant increase in movement ability relative to comparable, conventional joint assemblies. Further, the joint assemblies are preferably capable of withstanding greater recurring joint movement than comparable, conventional joint assemblies.

Thus, in one embodiment, the invention provides joint assemblies comprising at least two adjacent structural panels and a jointing composition adhering to and positioned between the at least two adjacent structural panels, said jointing composition including a sealant composition and a long chain ester.

Structural panels generally refer to structural, architectural, and decorative elements which are commonly used in modern construction. Adjacent structural panels are typically positioned in close proximity to one another. The surfaces of structural panels should not be positioned in direct contact with one another. Most frequently, the structural panels are spaced less than about 40 millimeters (mm) apart, more typically less than about 30 mm apart, usually less than 20 mm apart, and usually greater than or equal to about 6 mm apart. More specifically, the distance between two adjacent structural panels is typically between about, between about 10 mm and 40 mm, preferably between about 7.5 mm and 30 mm, and more preferably between about 6 mm and about 20 mm apart.

The structural panels can comprise a number of materials including but not limited to wood, thermoplastics, ceramics, mineral materials, metals, composites, and glass. Exemplary structural panels are concrete sections (or concrete slabs) of pedestrian-walkways (e.g., sidewalks), highways, airport runways, bridges, parking garages, parking lots, and other traffic surfaces (pedestrian and vehicular). Other exemplary structural panels include concrete wall sections, concrete wall dividers (e.g., a highway divider), brick walls, gypsum boards, masonry products, concrete panels of architectural and building (exterior and interior) facades, roofing, gutters, window panels, and other similar structural elements. Preferably, the structural panels are panels, slabs, or sections comprising materials that require high joint assembly movement ability (e.g., vinyl panels and aluminum siding) and/or have weak surface characteristics (concrete and other cementitious materials).

As used herein, the terms "sealant" and "sealant composition" refer to a composition which can be extruded, dispensed, poured and/or otherwise applied to a surface, which is capable of subsequent hardening to form a permanent adhesive bond with the surface.

The sealant composition typically includes a polymer having a molecular weight low enough for ease of application, and a curing agent for the polymer. Typically the sealant polymer has a molecular weight between about 1000 grams/mol and about 1,000,000 grams/mol, preferably between about 2500 grams/mol and about 500,000 grams/mol, most preferably between about 5000 grams/mol and about 100,000 grams/mol.

Ranges may be expressed herein as from "about" or "approximately" one particular value to "about" or "approximately" another particular value. When such a range is expressed, another embodiment includes the range from the one particular value to the other particular value. Similarly, when numerical values are expressed as approximations, e.g., by use of antecedents such as "at least about," "at least," and "about," it will be understood that the particular value forms another embodiment.

After application, the curing agent of the sealant composition typically causes cross-linkages to form between the polymers, typically resulting in the in-situ formation of a cross-linked/branched polymeric material having an elastomeric-like consistency. However, waterborne sealant compositions can include 'ready-made' high molecular weight polymers, which are encapsulated in emulsion form to provide sufficient flowability for application. Thus, a curing agent is typically not needed for development of desired physical properties in such an emulsion sealant composition.

Most sealant compositions comprise synthetic polymers; however, sealant compositions including natural polymers are also known. Representative synthetic sealant composition polymers in accordance with the invention include urethanes, modified urethanes, and the like.

Most polyurethane sealant compositions are prepared from a polyol (e.g., diols, polyethers, and polyesters) and a multifunctional isocyanate (i.e., a molecule having at least two isocyanate end groups such as, for example, diphenyl-methane-4,4-diisocyanate). A reaction between the hydroxyl end groups of the polyol and the isocyanate endgroups of the isocyanate forms urethane linkages between these molecules. Moisture can also react with the isocyanate end groups to form urea linkages between the molecules (while generating carbon dioxide). Commercially available polyurethane sealants are typically either one component or two component compositions.

A one-component ("1K") polyurethane sealant composition is typically prepared by reacting polyol molecules with an excess of isocyanate molecules (i.e., an amount sufficient to convert all hydroxyl end groups of the polyol to isocyanate end groups). The free isocyanate groups can react with water vapor from the air in a "moisture cure" to form urea linkages between the polymers. It takes a significant period of time for moisture to penetrate the sealant composition and react with the isocyanate groups, and therefore the formation of carbon dioxide bubbles is slow enough to allow the bubbles to dissipate without significant adverse effect on the strength of the sealant composition. While a 1K sealant composition has the advantage of not requiring mixing at the job site, it may take weeks or months for moisture to permeate the sealant composition and effect a complete cure after application. This allows opportunity for joint assembly movement after the sealant composition has been applied.

In a two component (2K) polyurethane sealant composition, a polyol is reacted with an isocyanate at nearly stoichiometric equivalence. Since these components are usually mixed at the job site (often viewed as a messy and bothersome procedure), moisture from the air can rapidly get into the system and react with the isocyanate end groups to form urea linkages and generate carbon dioxide. Air often gets incorporated with on-site mixing. The incorporated air and the carbon dioxide formed by the reaction of the sealant composition with water vapor can lead to bubble formation in the bulk of the sealant composition, which in turn can cause inconsistencies in strength. The advantage of a 2K sealant composition is that cure takes place relatively quickly (typically in a periods ranging from hours to a few days), thus joint assembly movement is minimized during the curing process.

The sealant compositions typically include additives such as solvents, plasticizers, fillers, UV stabilizers, and conventional adhesion promoters. For example, in sealant compositions sensitive to U.V. light, such as urethane sealant compositions, additives are typically added to block or absorb U.V. radiation or free radicals generated by the UV radiation. With many sealant compositions, conventionally known adhesion promoters are also added.

Some sealant compositions contain pre-cured polymers that are swollen or dispersed in solvents. For example, sealant compositions having large polymers, gums, waxes or pre-cured polymers dispersed in water in the form of an emulsion are known. In addition to many of the above types of ingredients and additives, emulsion-based sealant compositions typically include one or more surfactants.

Typical representative sealant compositions are described below:

1. Two-Component Urethane Sealant Compositions

First component (polymer): an amine or alcohol functionalized polyether.

Second component (curing agent): diisocyanates.

Additives: plasticizers, UV absorbers, dibutylphthalate, dibenzylphthalate, butylbenzylphthalate, carbon black, titanium dioxide.

Fillers: calcium carbonate and/or other common fillers such as PVC, clays, and minerals.

Conventionally known adhesion promoters: amino functionalized silanes.

Two-component urethane sealant compositions have good adhesion to most substrates (and thus are generally easy to apply), excellent resistance to abrasion and physical abuse, and good extensibility. Two-component urethane sealant compositions are available with joint movement capabilities as determined by ASTM C-719 testing method up to about ±25% of the joint width. Many two-component urethane sealant compositions lose joint movement ability as the temperature decreases.

2. One-Component Urethane Sealant Compositions

Polymer: reaction product of an amine or alcohol functionalized polyether with a diisocyanate.

Curing agent: diisocyanates.

Additives: plasticizers, UV absorbers, dibutylphthalate, dibenzylphthalate, butylbenzylphthalate, carbon black, titanium dioxide.

Fillers: calcium carbonate and/or other common fillers such as PVC, clays, and minerals.

Conventionally known adhesion promoters: amino functionalized silanes.

One-component urethane sealant compositions generally have the same properties as two-component urethane sealant compositions. The one-component urethane sealant compositions therefore typically have the same advantages and disadvantages as the two-component systems except that they do not require mixing and take relatively longer (considerably longer) to cure. Representative commercially available one-component urethane sealant compositions include Sonneborn sealant compositions.

3. Modified Urethane Sealant Compositions

Polymer: reaction product of an isocyanate functionalized polyether and an amino functionalized silane or alkoxysilane terminated polyether.

Curing agent: alkoxy functionalized silanes (methyltrimethoxysilane, etc).

Catalyst: dibutyltindicarboxylate.

Fillers: calcium carbonate and/or other common fillers such as PVC, clays, and minerals.

Additives: carbon black, titanium dioxide, plasticizers, UV absorbers, dibutylphthalate, dibenzylphthalate, and butylbenzylphthalate.

Conventionally known adhesion promoters: alkoxyaminosilanes, alkoxydiamino functionalized silanes, alkoxyacetoxy functionalized silanes, epoxy functionalized silanes, and isocyanurate functionalized silanes.

Modified urethane sealant compositions have generally the same properties as two-component urethane sealant compositions.

As previously explained, the combination of sealant compositions and one or more long chain esters unexpectedly provides a jointing composition having improved performance characteristics. The long chain esters are typically formed by reacting mono, di-, and/or tri-carboxylic acids containing one, two, or three $C_6$-$C_{24}$ long chain radicals or fatty acid residues, and alcohols containing a $C_3$-$C_{24}$ alkyl group. The properties and characteristics of suitable long chain esters are explained in greater detail below.

The long chain esters may be monoesters, diesters, triesters, or mixtures thereof, that may include saturated or unsaturated hydrocarbon chains, straight chain or branched, having none, one, two or three double bonds in the hydrocarbon chains.

The monoesters have a formula I, as follows:

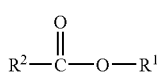

(I)

wherein $R^1$ is a $C_3$-$C_{24}$ alkyl, preferably $C_3$-$C_{18}$ alkyl, more preferably $C_6$-$C_{18}$ alkyl, straight chain or branched, saturated or unsaturated containing 1 to 3 carbon-to-carbon double bonds; and, $R^2$ is a $C_3$-$C_{24}$ hydrocarbon, preferably $C_6$-$C_{24}$ hydrocarbon, more preferably $C_8$-$C_{18}$ hydrocarbon, saturated or unsaturated having 1 to 6, preferably 1 to 3 carbon-to-carbon double bonds.

The diesters have a formula II or III, as follows:

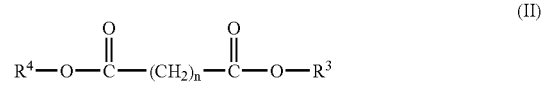

(II)

wherein n=3-24, preferably 6-18, and more preferably 3-10, and $R^3$ and $R^4$, same or different, are $C_3$-$C_{24}$ alkyl, preferably $C_3$-$C_{18}$ alkyl, more preferably $C_6$-$C_{18}$ alkyl, straight chain or branched, saturated or unsaturated containing 1 to 3 carbon-to-carbon double bonds.

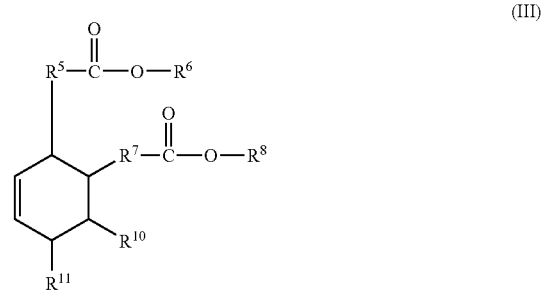

(III)

wherein $R^5$ and $R^7$, same or different, are $C_3$-$C_{24}$ alkyl, preferably $C_6$-$C_{24}$ alkyl, more preferably $C_8$-$C_{18}$ alkyl, straight chain or branched, either saturated or containing 1 to 6, preferably 1 to 3 carbon-to-carbon double bonds;

$R^6$ and $R^8$, same or different, are $C_3$-$C_{24}$ alkyl, preferably $C_3$-$C_{18}$ alkyl, more preferably $C_6$-$C_{18}$ alkyl, straight chain or branched, saturated or unsaturated containing 1 to 3 carbon-to-carbon double bonds; and $R^{10}$ and $R^{11}$, same or different, are $C_3$-$C_{24}$ saturated hydrocarbon chains, preferably $C_3$-$C_{18}$ saturated hydrocarbon chains, more preferably $C_6$-$C_{18}$ saturated hydrocarbon chains, straight chain or branched; or unsaturated $C_3$-$C_{24}$ hydrocarbon chains, preferably $C_3$-$C_{18}$ unsaturated hydrocarbon chains, more preferably $C_6$-$C_{18}$ unsaturated hydrocarbon chains, straight chain or branched, containing 1 to 6, preferably 1 to 3 carbon-to-carbon double bonds.

The triesters have a formula IV, as follows:

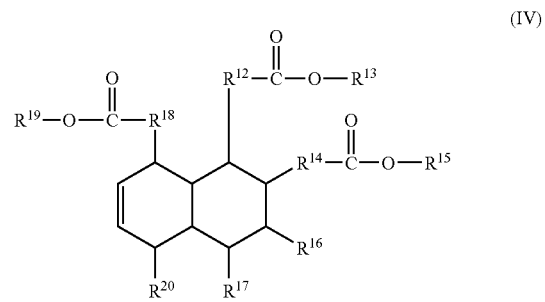

(IV)

wherein $R^{12}$, $R^{14}$ and $R^{18}$, same or different, are $C_3$-$C_{24}$ allyl preferably $C_6$-$C_{24}$ alkyl, more preferably $C_8$-$C_{18}$ alkyl, straight chain or branched, either saturated or containing 1 to 6, preferably 1 to 3 carbon-to-carbon double bonds;

$R^{13}$, $R^{15}$ and $R^{19}$, same or different, are $C_3$-$C_{24}$ alkyl, preferably $C_3$-$C_{18}$ alkyl, more preferably $C_6$-$C_{18}$ alkyl, straight chain or branched, saturated or unsaturated containing 1 to 3 carbon-to-carbon double bonds; and $R^{16}$, $R^{17}$ and $R^{20}$, same or different, are $C_3$-$C_{24}$ saturated hydrocarbon chains, preferably $C_3$-$C_{18}$ saturated hydrocarbon chains, more preferably $C_6$-$C_{18}$ saturated hydrocarbon chains, straight chain or branched; or unsaturated $C_3$-$C_{24}$ hydrocarbon chains, preferably $C_3$-$C_{18}$ unsaturated hydrocarbon chains, more preferably $C_6$-$C_{18}$ unsaturated hydrocarbon chains, straight chain or branched, containing 1 to 6, preferably 1 to 3 carbon-to-carbon double bonds.

The fatty acid residues or hydrocarbon chains $R^2$, $R^5$, $R^7$, $R^{12}$, $R^{14}$ and $R^{18}$ of the esters of formulas I, II, III, and IV can be any $C_3$-$C_{24}$ hydrocarbon chain, preferably any $C_6$-$C_{24}$ hydrocarbon chain, more preferably any $C_8$-$C_{18}$ hydrocarbon chain, either saturated or containing 1 to 6, preferably 1 to 3 carbon-to-carbon double bonds, and can be derived from animal or vegetable fatty acids such as butter; lard; tallow; grease; herring; menhaden; pilchard; sardine; babassu; castor; coconut; corn; cottonseed; jojoba; linseed; oiticica; olive; palm; palm kernel; peanut; rapeseed; safflower; soya; sunflower; tall; and/or tung. Examples are the hydrocarbon chain residues from the following fatty acids, where the number in parentheses indicates the number of carbon atoms, and the number of double bonds, e.g., ($C_{24-6}$) indicates a hydrocarbon chain having 24 carbon atoms and 6 double bonds: Hexanoic ($C_{6-0}$); Octanoic ($C_{8-0}$); Decanoic ($C_{10-0}$); Dodecanoic ($C_{12-0}$); 9-Dodecenoic (CIS) ($C_{12-1}$); Tetradecanoic ($C_{14-0}$); 9-Tetradecenoic (CIS) ($C_{14-1}$); Hexadecanoic (CIS) ($C_{16-0}$); 9-Hexadecenoic (CIS) ($C_{16-1}$); Octadecanoic ($C_{18-0}$); 9-Octadecenoic (CIS) ($C_{18-1}$); 9-Octadecenoic, 12-Hydroxy-(CIS) ($C_{18-2}$); 9,12-Octadecadienoic (CIS, CIS) ($C_{18-2}$); 9, 12, 15 Octadecatrienoic (CIS, CIS, CIS) ($C_{18-3}$); 9,11,13 Octadecatrienoic (CIS, TRANS, TRANS) ($C_{18-3}$); 9,11,13 Octadecatrienoic, 4-Oxo (CIS, TRANS, TRANS) ($C_{18-3}$); Octadecatetrenoic ($C_{18-4}$); Eicosanoic ($C_{20}$); 11-Eicosenoic (CIS) ($C_{20-1}$); Eicosadienoic ($C_{20-2}$); Eicosatrienoic ($C_{20-3}$); 5,8,11,14 Eicosatetraenoic ($C_{20-4}$); Eicosapentaenoic ($C_{20-5}$); Docosanoic ($C_{22}$); 13 Docosenoic (CIS) ($C_{22-1}$); Docosatetraenoic ($C_{22-4}$); 4,8,12,15,19 Docosapentaenoic ($C_{22-5}$); Docosahexaenoic ($C_{22-6}$); Tetracosenoic ($C_{24-1}$); and 4,8,12,15,18,21 Tetracosahexaenoic ($C_{24-6}$).

Examples of particularly useful diesters of formula II include a saturated diester formed by the reaction of sebacic acid and 2-ethylhexyl alcohol:

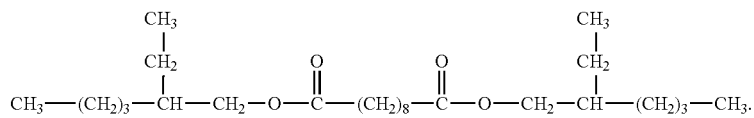

Other useful diesters falling within formula II include the saturated diester formed by the reaction of sebacic acid with tridecyl alcohol,

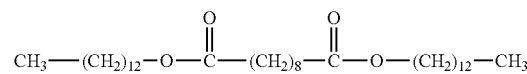

and the unsaturated diester formed by reaction of sebacic alcohol with oleyl alcohol:

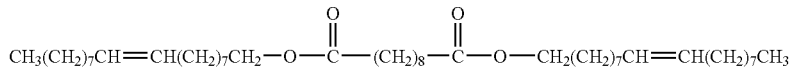

Useful cyclic diesters falling within formula III include dimerate ester structures formed by the reaction of a $C_{36}$ dimer acid derived from tall oil fatty acids and $C_3$-$C_{24}$, preferably $C_3$-$C_{18}$, more preferably $C_6$-$C_{18}$ alcohol, straight chain or branched, saturated or unsaturated containing 1 to 3 carbon-to-carbon double bonds. Examples of such cyclic esters include the following structures, wherein the dimer acid corresponding to structure A is formed by self reaction of linoleic acid, the dimer acid corresponding to structure B is formed by reacting linoleic acid with oleic acid, and the dimer acid corresponding to structure C is formed by reacting linoleic acid with linolenic acid:

(A)

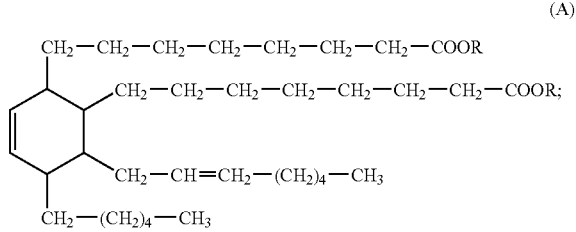

(B)

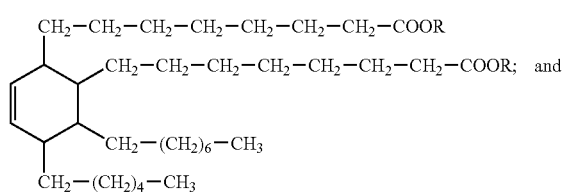

and

-continued

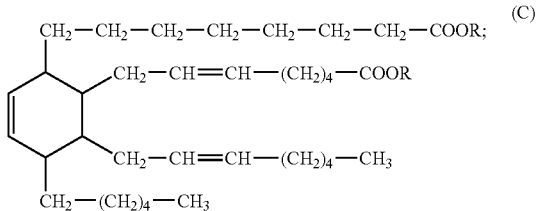

wherein each R, same or different, in formulas (A), (B), and (C) is a $C_3$-$C_{24}$ alkyl, preferably $C_3$-$C_{18}$ alkyl, more preferably $C_6$-$C_{18}$ alkyl, straight chain or branched, saturated or unsaturated containing 1 to 3 carbon-to-carbon double bonds. Another example of a useful unsaturated diester (dimerate ester) is formed by the reaction of a predominantly $C_{36}$ dimer acid reacted with 2-ethylhexyl alcohol. An additional useful unsaturated diester (dimerate ester) is formed by the reaction of a predominantly $C_{36}$ dimer acid with tridecyl alcohol.

A representative example of the triester (trimerate ester) of formula IV is the following structure (D):

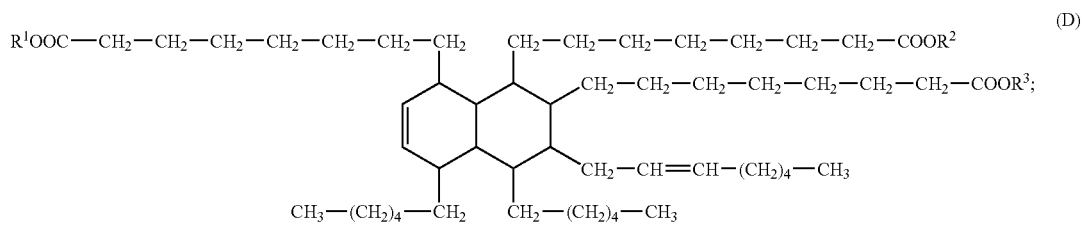

wherein each $R^1$, $R^2$, and $R^3$, same or different, is a $C_3$-$C_{24}$ radical, preferably $C_3$-$C_{18}$, more preferably $C_6$-$C_{18}$, straight chain, or branched, saturated or unsaturated containing 1 to 3 carbon-to-carbon double bonds.

A particularly useful blend of long chain esters is formed from blends of mono, dimer, and trimer acids, for example, products having CAS# 61788-89-4. Esters prepared from such products are blends including, primarily, the above $C_{36}$ and $C_{54}$ dimerate and trimerate esters (A), (B), (C) and (D), shown in the above structures, that is predominantly (more than 50% by weight) the $C_{36}$ dimerate esters (A), (B) and (C).

Commercially available blends of useful polybasic acids that can be reacted with $C_3$-$C_{24}$, preferably $C_3$-$C_{18}$, more preferably $C_6$-$C_{18}$ alcohols, straight chain or branched, saturated or unsaturated containing 1 to 3 carbon-to-carbon double bonds to produce the dimerate and trimerate esters, as blends, include the following: EMPOL® 1010 Dimer Acid; EMPOL® 1014 Dimer Acid; EMPOL® 1016 Dimer Acid; EMPOL® 1018 Dimer Acid; EMPOL® 1022 Dimer Acid; EMPOL® 1024 Dimer Acid; EMPOL® 1040 Trimer Acid; EMPOL® 1041 Trimer Acid; EMPOL® 1052 Polybasic Acid; and similar PRIPOL™ products from Uniqema as well as UNIDYME® products from Arizona Chemical.

Particularly useful long chain ester additives are made by reacting any of the long chain mono, dimer and/or trimer acids with one or more straight chain or branched $C_3$-$C_{24}$, preferably $C_3$-$C_{18}$, more preferably $C_6$-$C_{18}$ alcohols to produce the esters of formulas I, II, III and IV. Long chain esters can be formed by reacting suitable carboxylic acids with alcohols as previously described and including but not limited to 2-ethylhexyl alcohol, tridecyl alcohol, oleyl alcohol, and capryl alcohol.

The above dimer, trimer, and polybasic acids are produced by dimerizing, trimerizing, and polymerizing (oligomerizing) long chain carboxylic acids, particularly from the above-mentioned tall oil fatty acids. Tall oil fatty acids are often mixtures. Accordingly, the dimer acid produced by dimerizing a $C_{18}$ carboxylic acid (typically, a mixture of stearic, oleic, linoleic, and linolenic), after esterification, typically provides a blend of numerous dimerate and trimerate esters in accordance with formulas III and IV, including saturated and unsaturated esters (i.e., some long chain esters may contain hydrocarbon chains having 1 to 6, generally 1 to 3, carbon-to-carbon double bonds). Any one, or any blend, of the esters of formulas I, II, III and/or IV, when combined with a sealant composition will provide jointing compositions having improved performance characteristics as described in further detail below.

Typically, in the jointing compositions according to the invention, one or more long chain esters are added to a sealant composition in combination with an adhesive resin, but in some embodiments an adhesive resin is not added. Thus, the optional adhesive resin is usually dispersed in the jointing composition. The adhesive resin preferably is a condensation product of a formaldehyde or methylene donor and a formaldehyde or methylene acceptor, either pre-condensed, or condensed in-situ (e.g., after being dispersed in the sealant composition). A methylene donor is intended to mean a compound capable of reacting with a methylene acceptor. The most commonly employed methylene donor is a melamine, such as N-(substituted oxymethyl)melamine. The most commonly employed methylene acceptor is a phenol such as resorcinol or an equivalent molecule containing a reactive hydroxyl group.

Examples of suitable methylene donors include melamine, hexamethylenetetramine, hexaethoxymethylmelamine, hexamethoxymethylmelamine, lauryloxymethyl-pyridinium chloride, ethoxy-methylpyridinium chloride, trioxan hexamethoxy-methylmelamine, the hydroxy groups of which may be esterified or partly esterified, and polymers of formaldehyde, such as paraformaldehyde. In addition, the methylene donors may be N-substituted oxymethylmelamines, of the general formula:

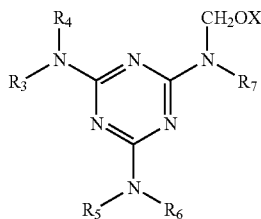

wherein X is an alkyl having from 1 to 8 carbon atoms $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis(methoxymethyl)melamine; N,N',N"trimethyl/N,N', N"-trimethylol-melamine; hexamethylolmelamine; N,N',N"-dimethylolmelamine; N-methylol-melamine; NN'-dimethylolmelamine; N,N',N"-tris(methoxymethyl)melamine; and N,N',N"-tributyl-N,N',N"-trimethylol-melamine.

The amounts of methylene donor and methylene acceptor, pre-condensed or condensed in-situ, that are present in the jointing compositions may vary. Typically, the amount of pre-condensed methylene donor and methylene acceptor is present will range from about 0.1 wt. % to about 15.0 wt. %; or each can be added separately in an amount of about 1 wt. % to about 10.0 wt. %, based on the weight of sealant composition in the jointing composition. Preferably, the amount of each the methylene donor and the methylene acceptor ranges from about 2.0 wt. % to about 8.0 wt. %, based on the weight of sealant in the sealant composition. The weight ratio of methylene donor to the methylene acceptor may vary. Generally speaking, the weight ratio will range from about 1:10 to about 10:1. Preferably, the weight ratio ranges from about 1:3 to 3:1.

Resorcinol-free adhesive resins also are useful in the jointing compositions described herein. For example, suitable resorcinol-free adhesive resins and adhesive compounds include those described in U.S. Pat. Nos. 5,891,938 and 5,298,539, both hereby incorporated by reference. The '938 patent discloses a self-condensing alkylated triazine resin having high imino and/or methylol functionality. U.S. Pat. No. 5,298,539 discloses additives which are substituted derivatives based on cyclic nitrogen compounds such as melamine, acetoguanamine, cyclohexylguanamine, benzoguanamine, and similar alkyl, aryl, and other substituted melamines, glycoluril and oligomers of these compounds. In particular, the adhesive resins and adhesive compounds which are useful as the adhesive resins include the following: adhesive resins selected from the group consisting of derivatives of melamine, acetoguanamine, benzoguanamine, cyclohexylguanamine and glycoluril monomers and oligomers of these monomers, which have been substituted on average at two or more positions on the monomer or on each unit of the oligomer with vinyl terminated radicals; and/or derivatives which have been further substituted on average at one or more positions with a radical which comprises carbamylmethyl or amidomethyl, all of these compositions being free of resorcinol.

Further, the adhesive resin can be any of the compounds of the following formulas:

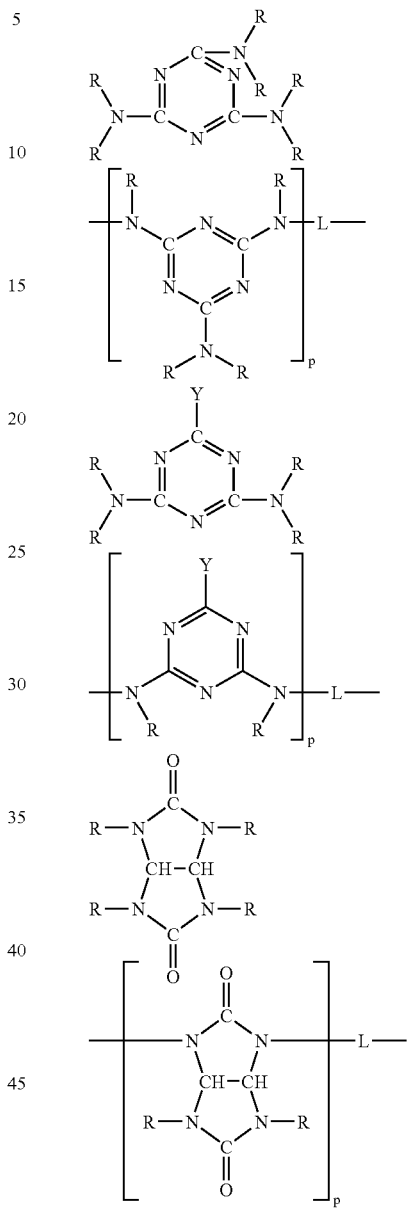

and positional isomers thereof, wherein, in each monomer and in each polymerized unit of the oligomers, Y is selected from methyl, phenyl and cyclohexyl, and, on average, at least two R are —$CH_2$—$R^1$, and any remaining R are H, and at least 2 $R^1$ are radicals selected from:

$CH_2$=$C(R^2)$—$C(O)$—$O$—, $CH_2$=$C(R^2)$—$C(O)$—Z, $CH_2$=$C(R^2)$—$C(O)$—NH—, and $CH_2$=$C(R^2)$—$CH_2$—O—, wherein $R^2$ is hydrogen or $C_1$-$C_{18}$ alkyl, and Z is a radical selected from:

—O—CH$_2$—CH$_2$—O—,

—O—CH$_2$—CH(CH$_3$)—O—,

—O—CH$_2$—CH$_2$—CH$_2$O—, and

—O—CH(C$_2$H$_5$)—O—, and any remaining $R^1$ radicals are selected from

—O—R$^3$,

—NH—C(O)—OR$^4$, and

—NH—C(O)—R$^4$, and wherein $R_3$ is hydrogen or $R_4$, and $R_4$ is a $C_1$-$C_{18}$ alkyl, alicyclic, hydroxyalkyl, alkoxyalkyl or aromatic radical, and in the oligomers, P is 2 to about 10, and L is methylene or the radical

—CH$_2$—O—CH$_2$—.

These adhesive compounds are particularly useful, wherein on average at least one $R^1$ in each monomer or in each oligomerized unit is —NH—C(O)—OR$^4$, particularly the compounds of the following formulas:

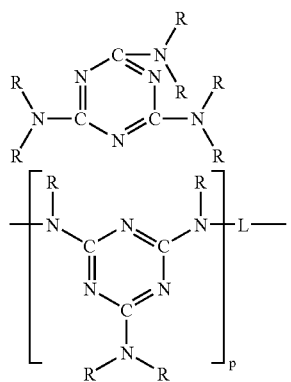

Particularly useful adhesive resins include the above formulas wherein on average, at least one R radical in each monomer or in each oligomerized unit is

—CH$_2$—NH—C(O)—OR$^4$, wherein $R^4$ is a $C_1$-$C_{18}$ alkyl, alicyclic, hydroxyalkyl, alkoxyalkyl or aromatic radical, and wherein, on average, at least two R radicals are selected from

CH$_2$=C(CH$_3$)—C(O)O—C$_3$H$_6$—O—CH$_2$— and

CH$_2$=CH$_2$—C(O)O—C$_2$H$_4$—O—CH$_2$— and at least one R radical is selected from

—CH$_2$—NH—C(O)—O—CH$_3$, and

—CH$_2$—NH—C(O)—O—C$_3$H$_7$.

These adhesive resins and compounds can include additional additives, particularly those selected from hydroxymethylated and alkoxymethylated (alkoxy having 1-5 carbon atoms) derivatives of melamine, acetoguanamine, benzoguanamine, cyclohexylguanamine and glycoluril and their oligomers.

Additional useful adhesive resins include self-condensing alkylated triazine resins selected from the group consisting of (i), (ii), and (iii):

(i) a self-condensing alkylated triazine resin having at least one of imino or methylol functionality and represented by the formula (I)

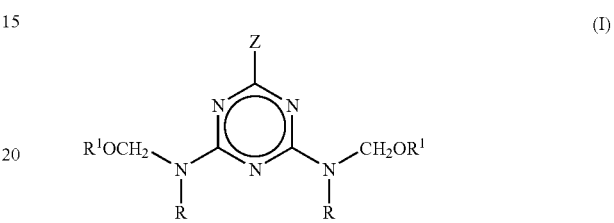

(ii) an oligomer of (i), or (iii) a mixture of (i) and (ii), wherein

Z is —N(R)(CH$_2$OR$^1$), aryl having 6 to 10 carbon atoms, alkyl having 1 to 20 carbon atoms or an acetyl group, each R is independently hydrogen or —CH$_2$OR$^1$, and each $R^1$ is independently hydrogen or an alkyl group having 1 to 12 carbon atoms, provided that at least one R is hydrogen or —CH$_2$OH and at least one $R^1$ is selected from the alkyl group; and wherein the composition is substantially free of methylene acceptor coreactants.

These adhesive resins are particularly useful wherein at least one R group is hydrogen and/or wherein at least one $R^1$ group is a lower alkyl group having 1 to 6 carbon atoms, particularly where the adhesive resin is a derivative of melamine, benzoguanamine, cyclohexylguanamine, or acetoguanamine, or an oligomer thereof.

One particularly useful alkylated triazine adhesive resin of the above formula is wherein Z is —N(R)(CH$_2$OR$^1$).

Another manner of eliminating resorcinol in an adhesive resin is to use N-(substituted oxymethyl)melamine and at least one of α- or β-naphthol. This adhesive resin employs the monohydric phenols, α- or β-naphthol, as methylene acceptors in the resin forming reaction in the absence of resorcinol.

Other useful adhesive resins include special latexes such as, for example, a vinyl-pyridine latex (VP latex) which is a copolymer of about 70 wt. % butadiene, about 15 wt. % styrene and about 15 wt. % 2-vinylpyridine; acrylonitrile rubber latexes; and styrene-butadiene rubber latexes. These can be used as such or in combination with one another. Another suitable adhesive resin are those which are applied in multi-stage processes, for instance a blocked isocyanate being applied in combination with polyepoxide and the material then being treated using customary resorcinol-formaldehyde resins (RFL dip). Additional useful adhesive resins include combinations of RFL dips with other adhesion-promoting substances such as, for example, a reaction product of triallyl cyanurate, resorcinol and formaldehyde or p-chlorophenol, resorcinol and formaldehyde.

Other suitable adhesive resins include polyurethane resins, epoxy resins, phenol aldehyde resins, polyhydric phenol aldehyde resins, phenol furfural resins, xylene aldehyde resins, urea formaldehyde resins, melamine formaldehyde resins, alkyd resins, polyester resins, and the like.

Throughout the specification, the long chain ester(s) and the optional adhesive resin(s) are generally used in a combined amount between about 0.2% by weight and about 30% by weight, based on the weight of the sealant composition(s) in the jointing composition(s). Typically, the ester and adhesive resin components are both present in an amount between about 0.1% and about 15% by weight, usually between about 0.25 wt. % and about 8 wt. %, and most preferably between about 0.3 wt. % and about 6 wt. %, based on the weight of the sealant composition(s) in the jointing composition.

Typically, in the jointing compositions, at least one ester compound in accordance with formulas I-IV is combined with an adhesive resin in a weight ratio between about 10 parts ester to about 1 part adhesive resin (i.e., a ratio of about 10:1, ester to resin, respectively) and about 1 part ester to about 10 parts resin (i.e., a ratio of about 1:10, ester to resin, respectively). More preferably, the esters are combined with an adhesive resin in a weight ratio between about 3 parts ester to about 1 part adhesive resin and about 1 part ester to about 3 parts resin. Most preferably, the ratio of ester to adhesive resin is approximately one to one.

The long chain esters and the optional adhesive resin(s) are usually added to a sealant composition(s) in a liquid form, and the composition is then mixed to disperse the long chain esters and optional adhesive resin therein using a conventional mixing apparatus such as a double centrifugal mixer (e.g., a Hauschild mixer distributed by Flack Tek, Inc., Landrum, S.C.). The long chain ester(s) and adhesive resin(s) can be solubilized in one or more suitable organic solvents. Alternatively, the long chain ester(s) and the optional adhesive resin(s) can be emulsified in water with one or more suitable emulsifying agents to form a water-based emulsion for addition to the sealant composition. The water-based emulsions should have an HLB value of about 4 to about 5 for best ester dispersion in the emulsion.

The long chain ester(s) and optional adhesive resin(s) can also be mixed with a preferably inert, dry carrier, such as calcium silicate, to form an alternative delivery system, which can be incorporated into the sealant composition(s) to form the jointing composition. In such systems, the dry, inert carrier facilitates dispersion throughout the sealant composition to form the jointing composition.

A representative system utilizing a dry carrier can be prepared by adding preheated resin liquid (e.g., Cyrez® CRA 138) to a dry carrier contained in a mixing bowl, followed by addition of a preheated representative long chain ester. The materials should be mixed at low speed for about 3 minutes. Such a dry carrier system is advantageous in that it permits liquids to be handled as powders. After mixing with a sealant composition for an additional period (e.g., three 26 second mixings), the carrier is distributed therein and the active ingredients are released from the carrier in the same manner as if it had been incorporated into the sealant composition as a neat material.

The jointing compositions described herein can be compounded by methods generally known with various commonly used additive materials such as, for example, processing additives, such as oils, resins including tackifying resins and plasticizers, fillers, pigments, fatty acids, waxes and antioxidants.

Referring now to the drawings, FIG. 1 shows a fragmentary view of a representative joint assembly 10 in accordance with the invention. The joint assembly 10 comprises two adjacent blocks or panels 2 and 3, which may be made from the same or different materials, and a jointing composition 1 adhering to and positioned between the at least two adjacent blocks or panels 2 and 3, said jointing composition including a sealant composition and a long chain ester. The joint assembly 10 provides a continuous seal between the blocks or panels 2 and 3, and may be positioned to form a seal between and absorb the relative movement of exterior sections of a building or transportation structure. Thus, the joint assembly 10 can be a vertical or horizontal joint assembly.

Joint assembly 10 is sometimes called a "butt joint assembly." Such joint assemblies are used in almost every building structure to absorb the movement from thermal expansion and to transition from one material to another. These joints are also used in highways, runways, sidewalks, and other flat (or not so flat) surfaces.

Figure 2:
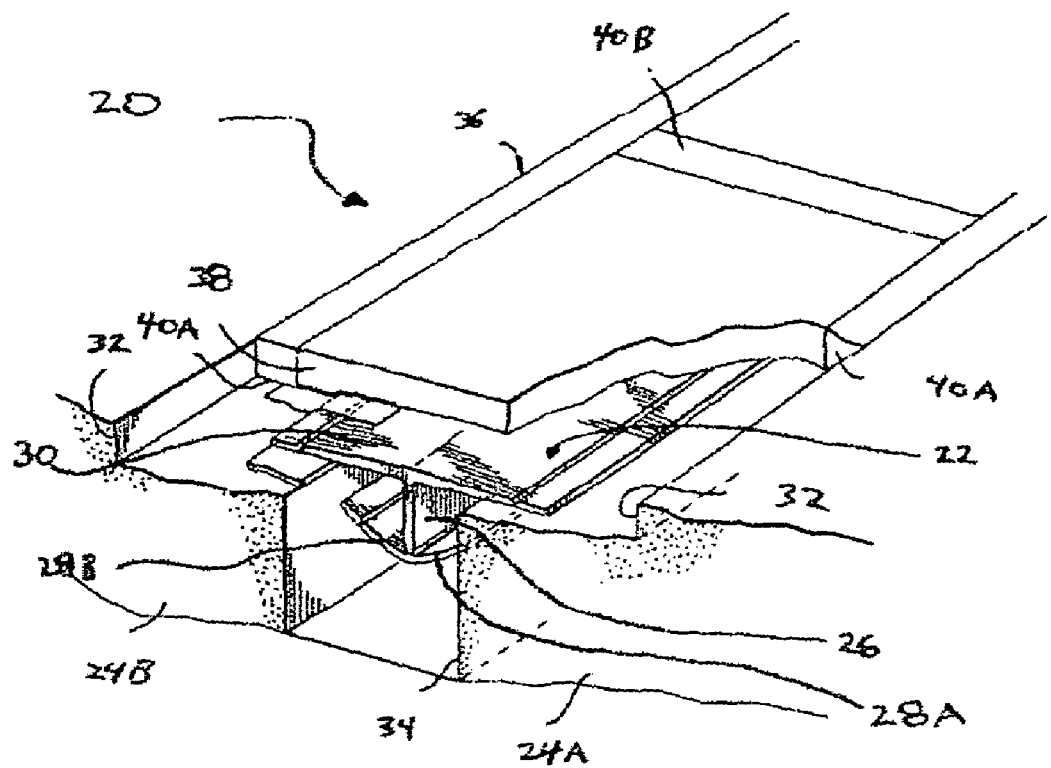
FIG. 2 is a fragmentary perspective view of another exemplary joint assembly.

FIG. 2 is a fragmentary perspective view of another exemplary joint assembly in accordance with the invention. FIG. 2 shows a joint assembly 20 including a supporting member or plate 22 between adjacent concrete sections 24A and 24B. The plate 22 includes a vertical stem 26 coupling lower wing portions 28A, 28B and upper planar support 30. The entire plate 22 can be extruded or molded from a rigid, plastic compound such as polyvinyl chloride, PVC, chlorinated polyvinyl chloride, CPVC, and acrylonitrile-butadiene-styrene, ABS. Also, other materials such as thermoplastic elastomers and metals may be employed.

The stem 26 supports the upper planar support 30, which in the illustrated embodiment, is symmetrically formed to extend outwardly from both sides about the stem 26. The surfaces of upper planar support 30 are adapted to rest on a boxed-out zone 32, which are typically provided when concrete roadways or the like are initially constructed. The boxed-out zone 32 extends the entire width of the concrete roadway section and may be several yards in length. The surfaces of upper planar support 30 of plate 22 provide support for any traffic (vehicular or pedestrian) moving across the expansion joint system from one concrete section to another.

The remainder of the boxed-out zone 32 between the concrete sections 24A, 24B above slot 34 is then filled with a jointing composition 36 in accordance with the invention above the plate 22. In the illustrated embodiment, jointing composition 36 is provided in the form of a slab 38 and nosings 40A and 40B. The slab 38 may be poured in place or premolded using a suitable jointing composition. At opposite ends of the slab 38 are nosings 40A, 40B, which are typically poured on site, to couple the slab 38 to the concrete sections 24A, 24B. Although slab 38 and nosings 40A, 40B are shown as separate parts, a one-piece slab (not shown) extending fully across boxed-out zone 32 may also be poured on site.

FIG. 3 shows other joint assembly structures in accordance with the invention which are often used in construction, transportation, and general industrial applications. In FIG. 3A, a sliding or overlap joint assembly is shown. Such joint assemblies are used in various applications including but not limited to the caps of parapet walls, the overlap of column covers, gutters, to seal rolled roofing and sheet goods, and around flashings. FIG. 3B illustrates a fillet joint assembly, which is a joint assembly that is most generally used to seal corner surfaces. These joint assemblies are used in construction applications to seal corner surfaces including but not limited to where a wall meets a floor; two walls intersect; a wall meets a door frame or window frame; and many other places. FIG. 3C illustrates a bridging or band-aid joint assembly. Such joint assemblies are often used to when high movement ability is required. Bridging joint assemblies are also useful to seal weak surfaces because they exert very little stress on the substrate structural panels in tension and almost no stress on compression. A backing rod or a bond breaker can be used in the aforementioned joint assemblies as is known in the art.

Figure 4A:
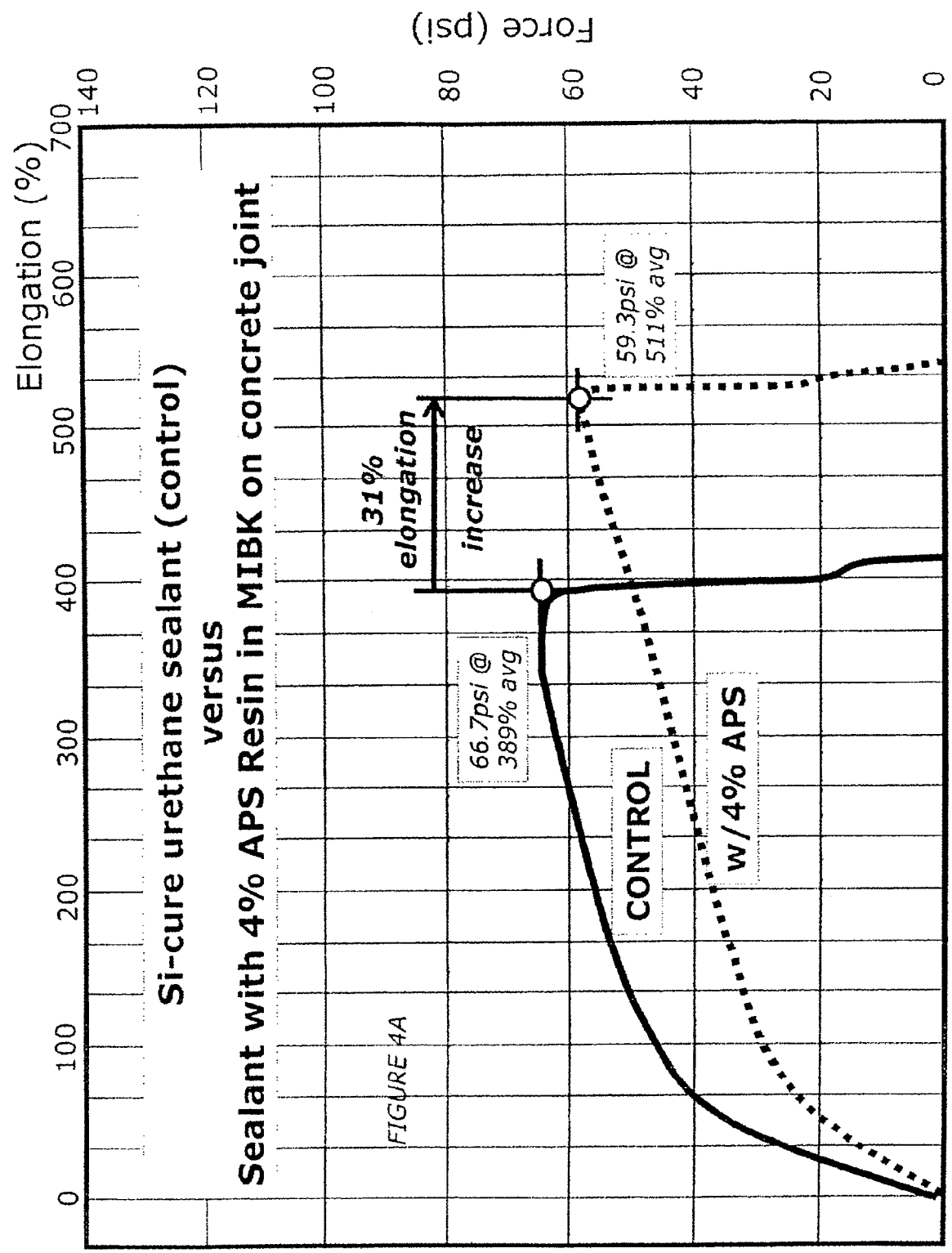
FIGS. 4A and 4B are graphs depicting data demonstrating the increased movement ability of a joint assembly in accordance with the invention; and, FIGS. 5A and 5B are additional graphs depicting data demonstrating the increased movement ability of a joint assembly in accordance with the invention.
Figure 4B:
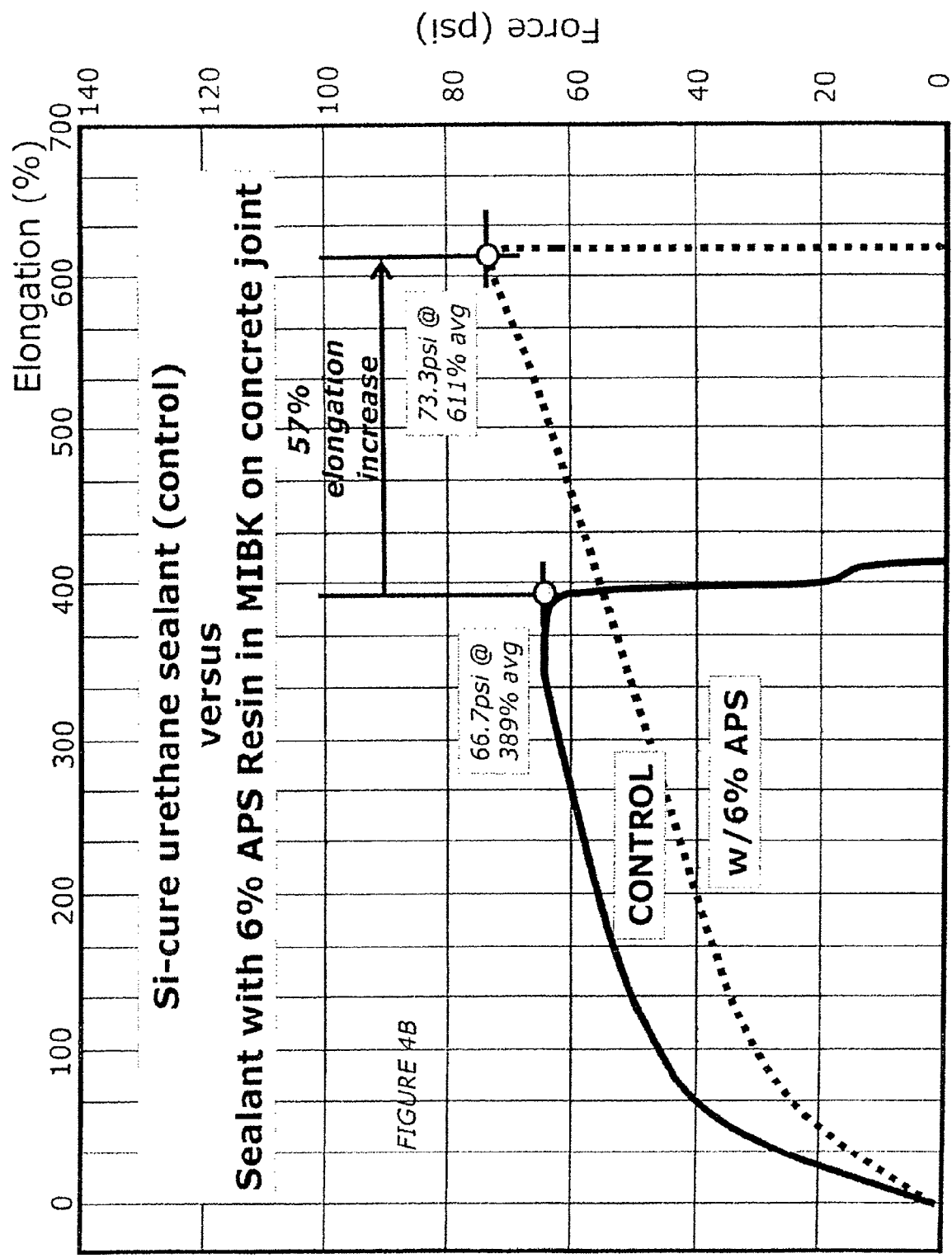
Figure 5A:
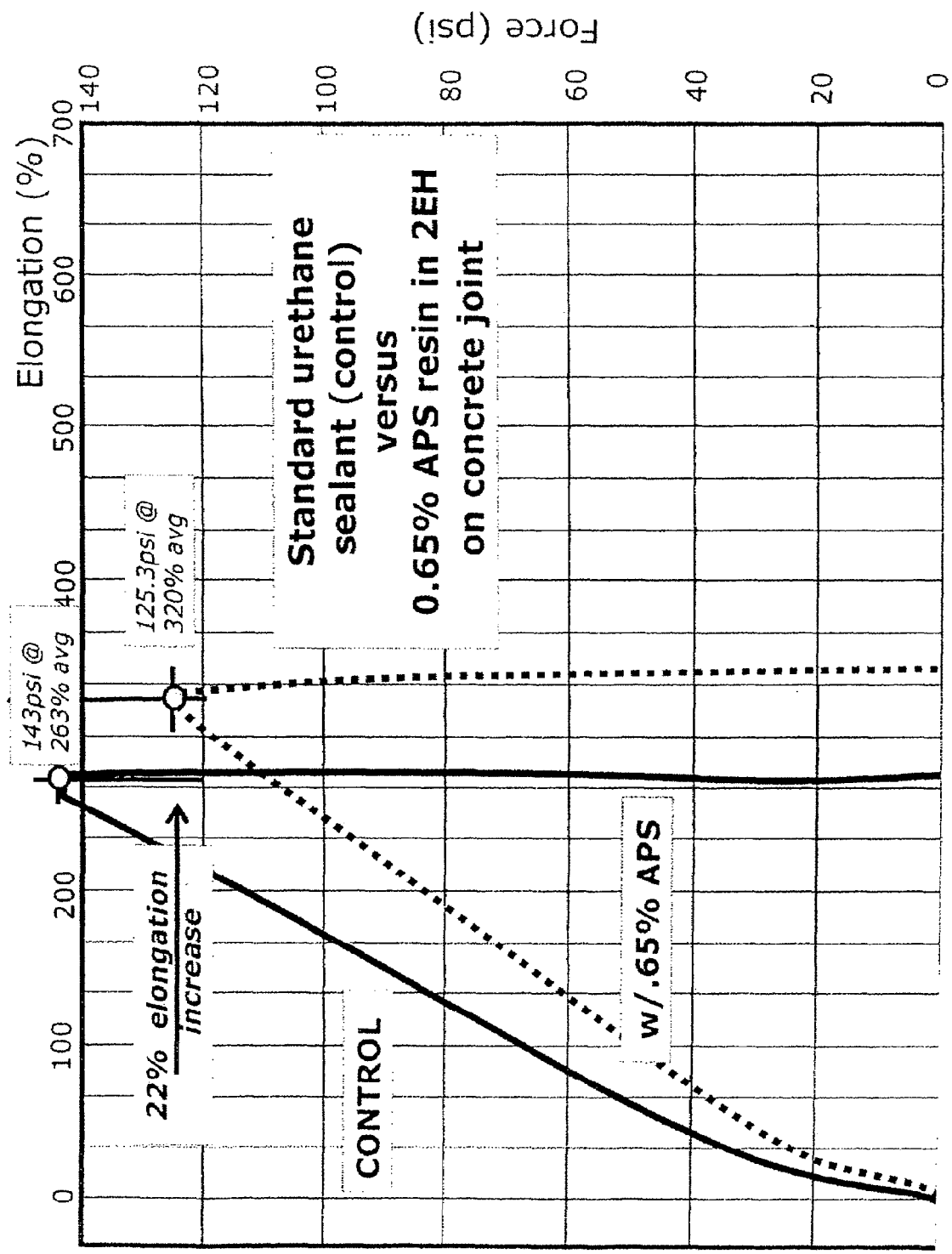
Figure 5B:
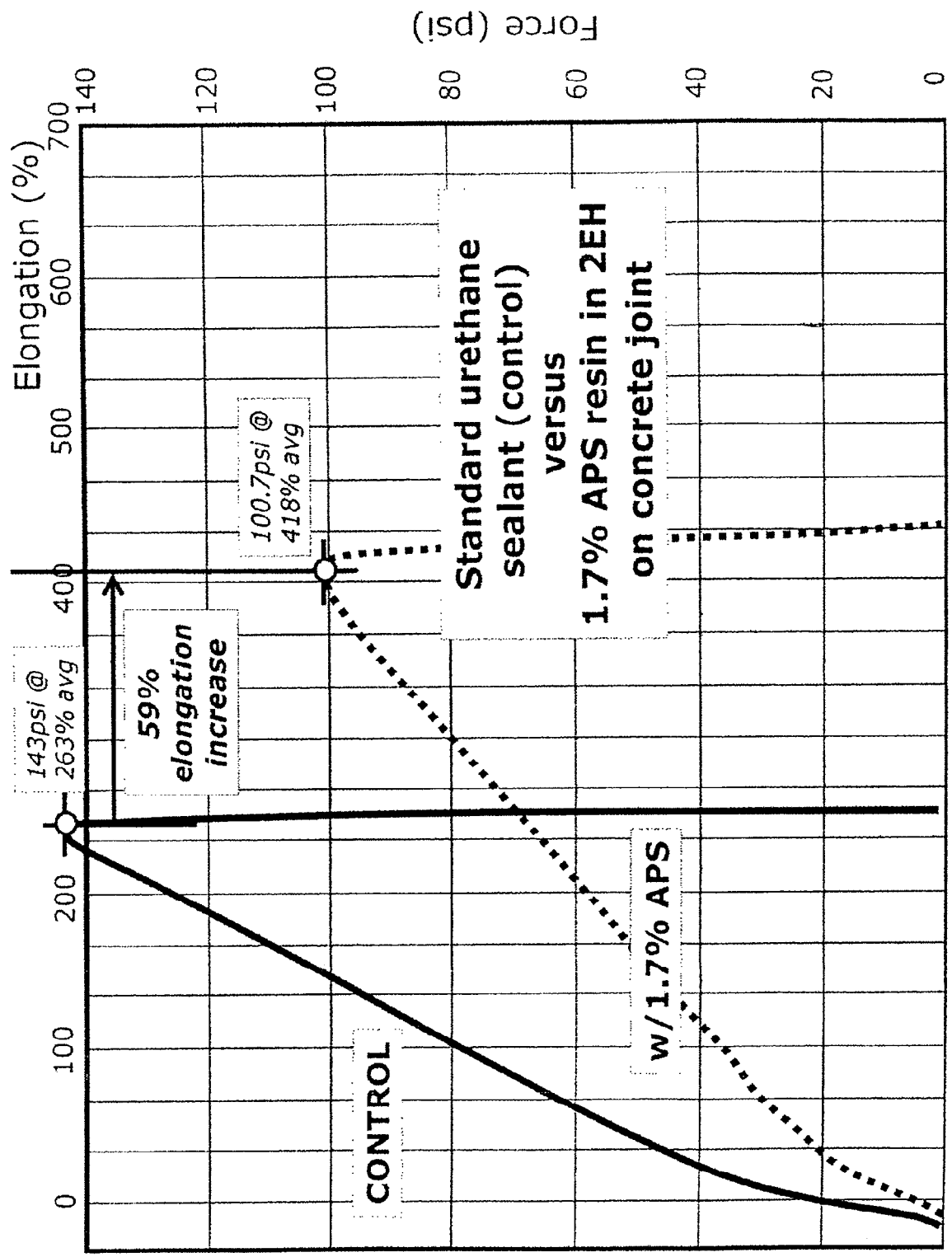

FIGS. 4A and 4B show the elongation of joint assemblies comprising two adjacent concrete panels and a jointing composition in accordance with the invention (here, the jointing composition comprised a modified urethane sealant composition (SICA AG, Switzerland), a long chain ester (di-2-ethylhexyl dimerate), and an adhesive resin (melamine)) relative to joint assemblies comprising two adjacent concrete panels and the modified urethane sealant composition. FIGS. 5A and 5B similarly show the elongation of joint assemblies comprising two adjacent concrete panels and a jointing composition in accordance with the invention (here, a jointing composition comprising a one-component urethane sealant composition, a long chain ester, and an adhesive resin) relative to joint assemblies comprising two adjacent concrete panels and a conventional one-component urethane sealant composition.

The long chain esters and the adhesive resins were added to the sealant compositions in the amounts indicated, and the mixture was mixed using a double centrifugal mixer (Hauschild mixing machine (160), available from Flack Tek Inc., Landrum, S.C.) for 3 periods of about 30 seconds. The cup was scraped between each mixing. After mixing, the cup of jointing composition was covered with plastic wrap, and air was displaced with an inert gas (such as butane). The cup was then capped and allowed to equilibrate for one day at ambient conditions. After equilibration, the jointing composition was used to make the joint assemblies.

The joint assemblies were prepared in accordance with ASTM C-719, which is incorporated herein by reference in its entirety. Briefly, 1 inch-by-1 inch-by-3 inch Portland cement concrete blocks were wiped to remove dust and other loose materials, positioned adjacent to each other, and divided by a Teflon spacer with end dams. The Teflon spacer included a 1 inch-by-½ inch-by-2 inch cavity centered therein. The jointing composition was deposited into the spacer cavity (using a caulking gun) and then tooled flat using a putty knife. The joint assemblies were allowed to cure for 4 weeks under ambient conditions, the spacer was removed, and the joint assemblies were tested using a Monsanto C-10 tensile testing machine.

In FIG. 4A, the inventive joint assembly demonstrated about 31 percent greater elongation (i.e., movement ability) while essentially maintaining the adhesive strength of the jointing composition to the substrate panel (relative to the value obtained with the control joint assembly as measured by the area under the curve). 3.8 grams of a liquid solution including about 42.5 percent long chain ester, about 42.5 weight percent adhesive resin, and about 15 weight percent methyl isobutyl ketone was added to and dispersed throughout about 90.2 grams of a modified sealant composition to form the jointing composition. The jointing assembly demonstrating improved elongation (relative to the control joint assembly) was prepared with this jointing composition in accordance with ASTM C-719.

FIG. 4B shows that the joint assembly movement ability shown in FIG. 4A was further augmented by increasing the concentration of the long chain ester and adhesive resin components of the inventive jointing compositions (relative to the amounts demonstrated by FIG. 4A). In FIG. 4B, the inventive joint assembly demonstrated about 57 percent greater elongation while increasing the adhesive strength of the jointing composition to the substrate panel (relative to the value obtained with the control joint assembly as measured by the area under the curve). 5.6 grams of a liquid solution including about 42.5 weight percent long chain ester, about 42.5 weight percent adhesive resin, and about 15 weight percent methyl isobutyl ketone was added to and dispersed throughout about 88.4 grams of the modified sealant composition to provide a jointing composition in accordance with the invention. The jointing assembly demonstrating improved elongation (relative to the control joint assembly) was prepared with this jointing composition in accordance with ASTM C-719.

In FIG. 5A, the inventive joint assembly demonstrated about 22 percent greater elongation (i.e., movement ability) while essentially maintaining the adhesive strength of the jointing composition to the substrate panel (relative to the value obtained with the control joint assembly as measured by the area under the curve). 0.61 grams of a liquid solution including about 42.5 weight percent long chain ester, about 42.5 weight percent adhesive resin, and about 15 weight percent 2-ethylhexanol was added to and dispersed throughout about 93.4 grams of a one-component urethane sealant composition to provide a jointing composition in accordance with the invention. The jointing assembly demonstrating improved elongation (relative to the control joint assembly) was prepared with this jointing composition in accordance with ASTM C-719.

FIG. 5B shows that joint assembly movement ability can be further augmented by increasing the concentration of the long chain ester and adhesive resin components of the inventive jointing compositions relative to the amounts shown in FIG. 5A. In FIG. 5B, the inventive joint assembly demonstrated 59 percent greater elongation while increasing the adhesive strength of the jointing composition to the substrate panel (relative to the value obtained with the control joint assembly as measured by the area under the curve). 1.7 grams of a liquid solution including about 42.5 weight percent long chain ester, about 42.5 weight percent adhesive resin, and about 15 weight percent 2-ethylhexanol was added to and dispersed throughout about 92.4 grams of the sealant composition to provide a jointing composition in accordance with the invention. The jointing assembly demonstrating improved elongation (relative to the control joint assembly) was prepared with this jointing composition in accordance with ASTM C-719.

The invention may be better understood by reference to the following examples in which parts and percentages are by weight unless otherwise indicated.

EXAMPLES

The following Table I provides exemplary materials for use in the joint assemblies, methods for installing joint assemblies, and jointing compositions according to the invention.

TABLE I

Exemplary Materials

| Material | Chemical Description | Supplier |
|---|---|---|
| One-component urethane sealant composition, diisocyanate cure | Typical urethane with polyetherbackbone polymeric system, a diisocyanate cure with filler, plasticizer, and additives for UV protection and adhesion. | Sonneborn |
| Two-component urethane sealant composition | Typical urethane with polyetherbackbone polymeric system, a diisocyanate cure with filler, plasticizer, and additives for UV protection and adhesion. | Sonneborn |

TABLE I-continued

Exemplary Materials

| Material | Chemical Description | Supplier |
|---|---|---|
| Modified urethane sealant composition | Silane functionalized polyether urethane, an alkoxysilane cure with filler, plasticizer, and additives for UV protection and adhesion. | SIKA AG |
| RX-13928 | RX-13804-42.5%, Resimene 3520 42.5%, 2EH-15% | The C. P. Hall Company |
| RX-13946 | Micro Cel E CSF 28%, RX13804 36%, Resimene 3520 36% | The C. P. Hall Company |
| RX-13845 | Micro Cel E CSF 28%, RX13804 36%, Cyrez CRA138M 36% | The C. P. Hall Company |
| RX-13804 | Di(2-ethylhexyl) dimerate (Empol 1016) | The C. P. Hall Company |
| Resimene 3520 | methylated melamine, formaldehyde polymer | Solutia |
| Cyrez ® CRA-138M | Melamine Formaldehyde Resin | Cytec |
| Micro Cel E CSF | Calcium Silicate | The C. P. Hall Company |

The following Table II is a summary of the solvent solubilities of a representative adhesive resin, melamine (Resimene 3520), and a representative long chain ester, RX-13804 (di-2-ethylhexyl dimerate), for use in selecting solvents capable of solubilizing both the ester and the resin to provide a liquid solution for preparation of a jointing composition in accordance with the invention. The solubilities were determined at 1:1 mixtures of solvent to dimerate/melamine. If both the samples were soluble in the solvent, the solutions were again mixed at a 1:1 ratio of dimerate+solvent to melamine+solvent. As shown in the second part of the table, the dimerate ester and melamine resin are completely soluble so long as 13% by weight or greater solvent (here, 2-ethylhexanol) is present.

TABLE II

Solvent Solubilities

Part I: Melamine/Dimerate Solubilities (Spot Check)

| Solvent | RX13804 | Melamine | RX13804 + Melamine |
|---|---|---|---|
| Xylene | S | S | S |
| 1,4-Dioxane | S | S | S |
| Toluene | S | S | S |
| Acetonitrile | I | S | I |
| Ethanol | I | S | I |
| n-Hexanol | S | S | S |
| Ethyl Acetate | S | S | S |
| N,N-Dimethylformamide | I | S | I |
| n-Butanol | S | S | S |
| 2-EH (2-ethylhexanol) | S | S | S |
| Methyl Ethyl Ketone | S | S | S |
| Methyl Isobutyl Ketone | S | S | S |
| Butyl Acetate | S | S | S |
| Chloroform | S | S | S |
| Carbon Tetrachloride | S | S | S |
| Hexane | S | I | I |
| Heptane | S | I | I |
| Isopropanol | S | S | S |
| Isodecyl alcohol | S | S | S |
| Isotridecyl alcohol | S | S | S |
| Ethylene glycol monobutyl ether | S | S | S |
| Dipropylene glycol monobutyl ether | S | S | S |

TABLE II-continued

Solvent Solubilities

Part II: Melamine/Dimerate Solubilities with 2-EH (Quantitative)

| Sample | % RX13804 | % Melamine | % 2-EH | Appearance |
|---|---|---|---|---|
| 1 | 42.5 | 42.5 | 15.0 | Clear |
| 2 | 43.0 | 43.0 | 14.0 | Clear |
| 3 | 43.2 | 43.2 | 13.6 | Clear |
| 4 | 43.3 | 43.3 | 13.4 | Clear |
| 5 | 43.5 | 43.5 | 13.0 | Hazy (Insoluble) |

S = Soluble;
I = Insoluble

Table III provides an exemplary long chain ester and adhesive resin combination in a water-based emulsion. In order to homogeneously emulsify the ester and/or the resin components of the adhesion promoter in a water-based carrier, any suitable emulsifying/dispersing agents can be used that are capable of forming a stable emulsion. Since the long chain esters have a very low polarity and the adhesive resins typically have a very high polarity, a combination of emulsifying agents is generally needed to provide a homogeneous, stable emulsion in water. The water-based emulsions should have a hydrophilic/lipophilic balance (HLB) in the range of about 4 to about 5 for best emulsification. Particular combinations of emulsifying agents found to be especially effective in providing a homogeneous, stable water-based emulsion of the dimerate esters and adhesive resin include a combination of an anionic metal stearate, e.g., potassium stearate for the ester, and a non-ionic sorbitan oleate for the adhesive resin, as shown in the following emulsion preparation guide:

| | |
|---|---|
| RX-13804 | 49 |
| Stearic acid | 0.2 } K Stearate |
| KOH (45%) | 0.1 |
| Cyrez CRA-138M | 48.7 |
| Span80 (sorbitan oleate) | (2 to 6%) based on the weight of dimerate ester (RX-13804) |

After adding Stearic acid, heat up to 90° C.; add KOH slowly while mixing, mix for 5 minutes, then cool the mixture down to around 50° C. Then add Cyrez, then Span80.

TABLE III

Water-Based Emulsion

| Composition Component | % by wt. | Chemical | Supplier |
|---|---|---|---|
| RX-13804 | 49.0 | Di-2-ethylhexyl dimerate | C. P. Hall |
| Stearic acid | 0.2 | tripled pressed Stearic acid | Witco |
| KOH (45%) | 0.1 | Potassium hydroxide 45% | Ashta |
| Cyrez CRA-138M | 48.7 | methylated melamine, formaldehyde polymer | Cytec |
| Span80 | 2.0 | sorbitan monooleate | Uniqema |

What is claimed is:

1. A joint assembly comprising at least two adjacent structural panels and a jointing composition adhering to and positioned between the at least two adjacent structural panels, said jointing composition including a sealant composition and a long chain ester having formula I, II, III, IV or a combination of any two or more of said esters in an amount of about 0.1% to about 15% by weight, based on the weight of the sealant composition in the jointing composition:

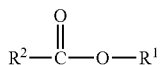
(I)

wherein R¹ is a $C_3$-$C_{24}$ alkyl radical, straight chain or branched, saturated or unsaturated containing 1 to 3 carbon-to-carbon double bonds; R² is a $C_3$-$C_{24}$ saturated fatty acid residue, or an unsaturated fatty acid residue having 1 to 6 carbon-to-carbon double bonds;

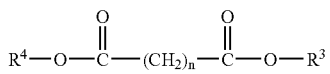
(II)

wherein n=3-24, and R³ and R⁴, same or different, are a $C_3$-$C_{24}$ alkyl radical, straight chain or branched, saturated or unsaturated containing 1 to 3 carbon-to-carbon double bonds;

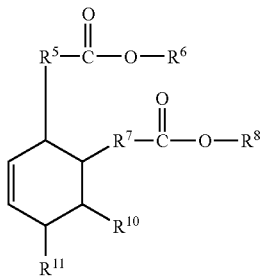
(III)

wherein R⁵ and R⁷, same or different, are a $C_3$-$C_{24}$ hydrocarbon chain, straight chain or branched, either saturated or having 1 to 6 carbon-to-carbon double bonds;

R⁶ and R⁸, same or different, are $C_3$-$C_{24}$ alkyl radical, straight chain or branched, saturated or unsaturated containing 1 to 3 carbon-to-carbon double bonds; and R¹⁰ and R¹¹, same or different, are a $C_3$-$C_{24}$ saturated hydrocarbon chain, straight chain or branched; or an unsaturated $C_3$-$C_{24}$ hydrocarbon chain, straight chain or branched, having 1 to 6, carbon-to-carbon double bonds;

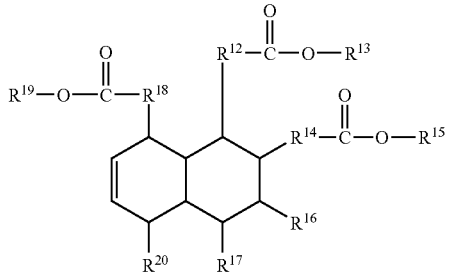
(IV)

wherein R¹², R¹⁴ and R¹⁸, same or different, are a $C_3$-$C_{24}$ hydrocarbon chain, straight chain or branched, either saturated or having 1 to 6 carbon-to-carbon double bonds;

R¹³, R¹⁵ and R¹⁹, same or different, are a $C_3$-$C_{24}$ alkyl, straight chain or branched, saturated or unsaturated containing 1 to 3 carbon-to-carbon double bonds; and R¹⁶, R¹⁷ and R²⁰, same or different, are a $C_3$-$C_{24}$ saturated hydrocarbon chain, straight chain or branched; or unsaturated $C_3$-$C_{24}$ hydrocarbon chain, straight chain or branched, containing 1 to 6 carbon-to-carbon double bonds.

2. The joint assembly of claim 1, wherein the ester is selected from the group consisting of formula I, II, III, IV, and a combination of any two or more of said esters:

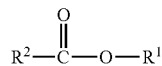
(I)

wherein R¹ is a $C_3$-$C_{18}$ alkyl radical, straight chain or branched, saturated or unsaturated containing 1 to 3 carbon-to-carbon double bonds; and R² is a $c_8$-$c_{18}$ saturated fatty acid residue, or an unsaturated fatty acid residue having 1 to 3 carbon-to-carbon double bonds;

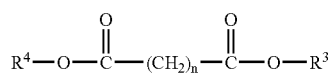
(II)

wherein n=6-18, and R³ and R⁴, same or different, are a $C_3$-$C_{18}$ alkyl radical, straight chain or branched, saturated or unsaturated containing 1 to 3 carbon-to-carbon double bonds;

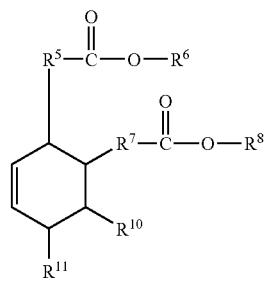
(III)

wherein R⁵ and R⁷, are a $C_6$-$C_{24}$ hydrocarbon chain, straight chain or branched; either saturated or having 1 to 3 carbon-to-carbon double bonds;

R6 and R8, same or different, are a C3-C18 alkyl radical, straight chain or branched, saturated or unsaturated containing 1 to 3 carbon-to-carbon double bonds; and R¹⁰ and R¹¹, same or different, are a $C_3$-$C_{18}$, saturated hydrocarbon chain, straight chain or branched; or an unsaturated hydrocarbon chain, straight chain or branched, containing 1 to 3 carbon-to-carbon double bonds;

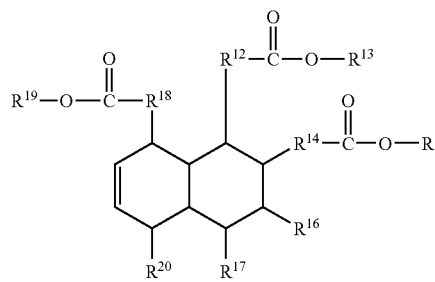
(IV)

wherein $R^{12}$, $R^{14}$ and $R^{18}$, same or different, are a $C_8$-$C_8$ hydrocarbon chain, straight chain or branched, either saturated or having 1 to 3 carbon-to-carbon double bonds;

$R^{13}$, $R^{15}$ and $R^{19}$, same or different, are a $C_6$-$C_{18}$ alkyl radical, straight chain or branched, saturated or unsaturated containing 1 to 3 carbon-to-carbon double bonds; and $R^{16}$, $R^{17}$ and $R^{20}$, same or different, are a $C_6$-$C_{18}$ saturated hydrocarbon chain, straight chain or branched; or an unsaturated $C_6$-$C_{15}$ hydrocarbon chain, straight chain or branched, containing 1 to 3 carbon-to-carbon double bonds.

3. The joint assembly of claim 1, wherein the adhesive resin is a condensation product of a methylene acceptor and a methylene donor.

4. The joint assembly of claim 3, wherein the adhesive resin is selected from the group consisting of phenol-formaldehyde, melamine-formaldehyde; naphthol-formaldehyde; polyepoxide; a reaction product of triallyl cyanurate, resorcinol, and formaldehyde; a reaction product of p-chlorophenol, resorcinol, and formaldehyde; a copolymer of styrene, butadiene, and 2-vinylpyridine; and mixtures thereof.

5. The joint assembly of claim 4, wherein the phenol-formaldehyde resin is resorcinol-formaldehyde.

6. The joint assembly of claim 1, wherein the adhesive resin is selected from the group consisting of derivatives of melamine, acetoguanamine, benzoguanamine, cyclohexylguanamine and glycoluril monomers and oligomers of these monomers, which have been substituted on average at two or more positions on the monomer or on each unit of the oligomer with vinyl terminated radicals, the composition being free of resorcinol.

7. The joint assembly of claim 6, wherein at least one of the adhesive resins has been further substituted on average at one or more positions with a radical which comprises carbamoylmethyl or amidomethyl.

8. The joint assembly of claim 6, wherein the adhesive resin is selected from compounds of the formula:

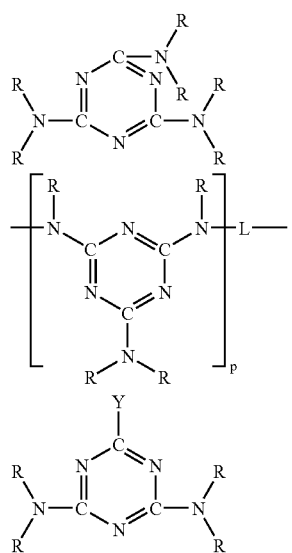

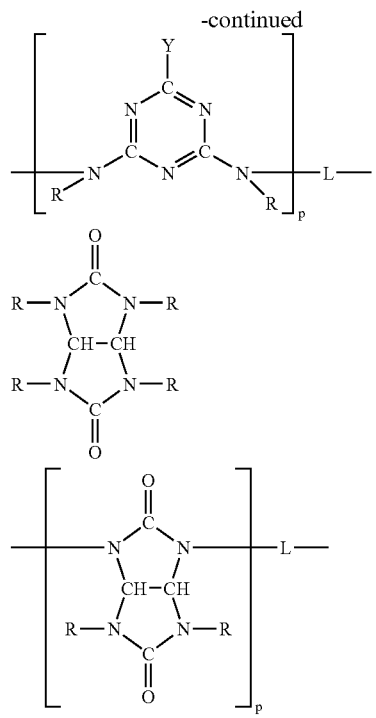

-continued and positional isomers thereof, wherein, in each monomer and in each polymerized unit of the oligomers, Y is selected from methyl, phenyl and cyclohexyl, and, on average, at least two R are —$CH_2$— $R^1$, and any remaining R are H, and at least 2 $R^1$ are radicals selected from $CH_2\!=\!C(R^2)$—C(O)—O—, $CH_2\!=\!C(R^2)$—C(O)—Z, $CH_2\!=\!C(R^2)$—C(O)—NH—, and $CH_2\!=\!C(R^2)$—$CH_2$—O—, wherein $R^2$ is hydrogen or $C_1$-$C^{18}$ alkyl, and Z is a radical selected from

—O—$CH_2$—$CH_2$—O—,

—O—$CH_2$—$CH(CH_3)$—O—,

—O—$CH_2$—$CH_2$—$CH_2O$—, and

—O—$CH(C_2H_5)$—O—, and any remaining $R^1$ radicals are selected from

—O—$R^3$,

—NH—C(O)—$OR^4$, and

—NH—C(O)—$R^4$, and wherein $R^3$ is hydrogen or $R_4$, and $R_4$ is a $C_1$-$C_{18}$ alkyl, alicyclic, hydroxyalkyl, alkoxyalkyl or aromatic radical, and in the oligomers, P is 2 to about 10, and L is methylene or the radical

—$CH_2$—O—$CH_2$—.

9. The joint assembly of claim 8, wherein on average at least one $R^1$ in each monomer or in each oligomerized unit of the adhesive resin is:

—NH—C(O)—OR$^4$ wherein $R^4$ is as defined in claim 8.

10. The joint assembly of claim 9, wherein the adhesive resin is a compound of the formula

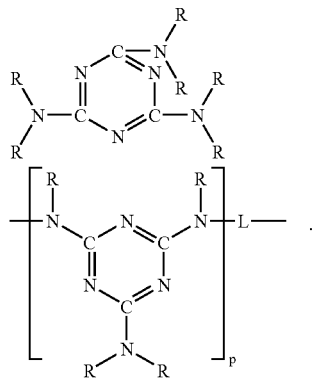

11. The joint assembly of claim 10, wherein in the adhesive resin formulas, on average at least one R radical in each monomer or in each oligomerized unit is

—CH$_2$—NH—C(O)—OR$^4$ wherein $R^4$ is a $C_1$-$C_{18}$ alkyl, alicyclic, hydroxyalkyl, alkoxyalkyl or aromatic radical.

12. The joint assembly of claim 10, wherein on average at least two R radicals are selected from

CH$_2$=C(CH$_3$)—C(O)O—C$_3$H$_6$—O—CH$_2$— and

CH$_2$=CH$_2$—C(O)O—C$_2$H$_4$—O—CH$_2$—and at least one R radical is selected from

—CH$_2$—NH—C(O)—O—CH$_3$ and

—CH$_2$—NH—C(O)—O—C$_3$H$_7$.

13. The joint assembly of claim 8, further comprising an additional additive selected from hydroxymethylated and alkoxymethylated (alkoxy having 1-5 carbon atoms) derivatives of melamine, acetoguanamine, benzoguanamine, cyclohexylguanamine and glycoluril and their oligomers.

14. The joint assembly of claim 6, wherein the adhesive resin is a derivative of melamine or an oligomer of melamine.

15. The joint assembly of claim 6, wherein the adhesive resin is a derivative of acetoguanamine or an oligomer of acetoguanamine.

16. The joint assembly of claim 6, wherein the adhesive resin is a derivative of benzoguanamine or an oligomer of benzoguanamine.

17. The joint assembly of claim 6, wherein the adhesive resin is a derivative of cyclohexylguanamine or an oligomer of cyclohexylguanamine.

18. The joint assembly of claim 1, wherein the adhesive resin is a self-condensing alkylated triazine resin selected from the group consisting of (i),(ii), and (iii):

(i) a self-condensing alkylated triazine resin having at least one of imino or methylol functionality and represented by formula (I)

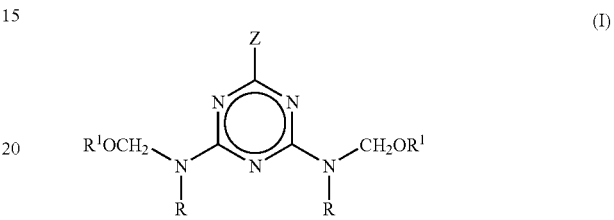

(ii) an oligomer of(i), or (iii) a mixture of(i) and (ii), wherein

Z is —N(R)(CH$_2$OR$^1$), aryl having 6 to 10 carbon atoms, alkyl having 1 to 20 carbon atoms or an acetyl group, each R is independently hydrogen or —CH$_2$OR$^1$, and each $R^1$ is independently hydrogen or an alkyl group having 1 to 12 carbon atoms, provided that at least one R is hydrogen or —CH$_2$OH and at least one $R^1$ is selected from the alkyl group; and wherein the sealant composition is substantially free of methylene acceptor coreactants.

19. The joint assembly of claim 18, wherein at least one R group is hydrogen.

20. The joint assembly of claim 19, wherein at least one $R^1$ group is a lower alkyl group having 1 to 6 carbon atoms.

21. The joint assembly of claim 20, wherein the adhesive resin is a derivative of melamine, benzoguanamine, cyclohexylguanamine, or acetoguanamine, or an oligomer thereof.

22. The joint assembly of claim 20, wherein Z is —N(R)(CH$_2$OR$^1$).

23. The joint assembly of claim 4, wherein the phenol-formaldehyde resin is resorcinol-formaldehyde; and the melamine-formaldehyde resin is N—(substituted oxymethyl) melamine-formaldehyde.

24. The joint assembly of claim 1, wherein the ester has the formula II and comprises a saturated diester formed by the reaction of sebacic acid and a $C_{3\text{-}24}$ alcohol, straight chain or branched, saturated or unsaturated containing 1 to 3 carbon-to-carbon double bonds.

25. The joint assembly of claim 24, wherein the alcohol is 2-ethylhexyl alcohol, and the ester has the following formula:

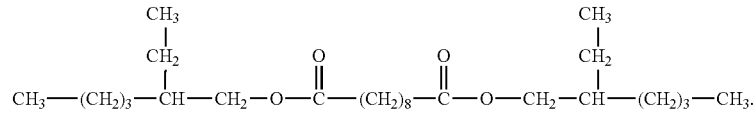

26. The joint assembly of claim 1, wherein the ester is an unsaturated diester formed by the reaction of a $C_{36}$ dimer acid and a $C_3$-$C_{24}$ alcohol, straight chain or branched, saturated or unsaturated containing 1 to 3 carbon-to-carbon double bonds.

27. The joint assembly of claim 26, wherein the alcohol is 2-ethylhexyl alcohol.

28. The joint assembly of claim 26, wherein the alcohol is tridecyl alcohol.

29. The joint assembly of claim 26, wherein the alcohol is oleyl alcohol.

30. The joint assembly of claim 1, wherein the ester comprises the following dimer acid reacted with a $C_3$-$C_{24}$ alcohol:

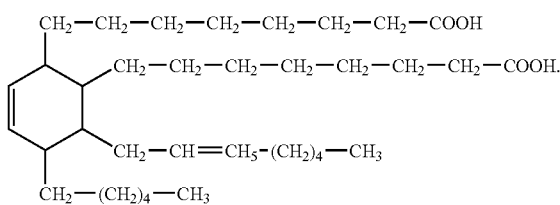

31. The joint assembly of claim 1, wherein the ester comprises the following dimer acid reacted with a $C_3$-$C_{24}$ alcohol:

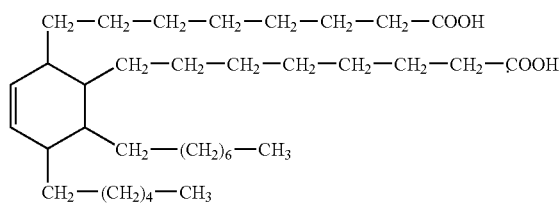

32. The joint assembly of claim 1, wherein the ester comprises the following dimer acid reacted with a $C_3$-$C_{24}$ alcohol:

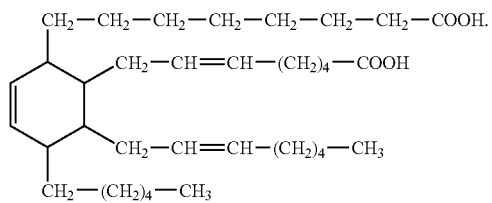

33. The joint assembly of claim 1, wherein the ester is the reaction product of a $C_3$-$C_{24}$ alcohol with a tricarboxylic acid having the following formula:

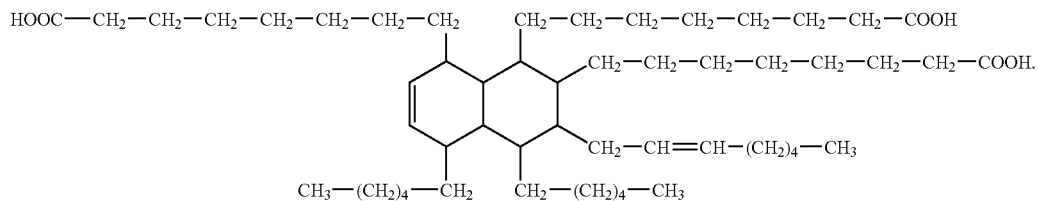

34. The joint assembly of claim 1, wherein the ester is a combination of compounds of formula I, II, III, and IV.

35. The joint assembly of claim 34, wherein the ester is a reaction product of a $C_3$-$C_{24}$ alcohol straight chain or branched, saturated or unsaturated having 1 to 3 carbon-to-carbon double bonds, with a dimer acid having CAS #61788-89-4.

36. The joint assembly of claim 35, wherein the alcohol is 2-ethylhexyl alcohol.

37. The joint assembly of claim 35, wherein the alcohol is tridecyl alcohol.

38. The joint assembly of claim 35, wherein the alcohol is oleyl alcohol.

39. The joint assembly of claim 35, wherein the alcohol is capryl alcohol.

40. The joint assembly of claim 1, wherein the ester is a combination of compounds having formula II, III, and IV.

41. The joint assembly of claim 1, wherein the ester has formula III.

42. The joint assembly of claim 1, wherein the ester has formula IV.

43. The joint assembly of claim 1, wherein the sealant composition comprises a polymer having a molecular weight between about 5000 grams/mol and about 100,000 grams/mol, and a curing agent for the polymer.

44. The joint assembly of claim 43, wherein the sealant composition is selected from the group consisting of synthetic polymers and natural polymers.

45. The joint assembly of claim 44, wherein the polymer is a synthetic polymer selected from the group consisting of urethanes and modified urethanes.

46. The joint assembly of claim 1, wherein the $R^2$, $R^5$, $R^7$, $R^{12}R^{14}$ are fatty acid residues derived from animal or vegetable fatty acids.

47. The joint assembly of claim 46, wherein the fatty acids are selected from the group consisting of butter; lard; tallow; grease; herring; menhaden; pilehard; sardine; babassu; castor; coconut; corn; cottonseed; jojoba; linseed; oiticia; olive; palm; palm kernel; peanut; rapeseed; safflower; soya; sunflower; tall; tung; and mixtures thereof.

48. The joint assembly of claim 46, wherein the fatty acid residues are selected from the group consisting of hexanoic; octanoic; decanoic; dodecanoic; 9-dodecenoic; tetradecanoic; 9-tetradecenoic; hexadecanoic; 9-hexadecenoic; octadecanoic; 9-octadecenoic; 9-octadecenoic, 12-hydroxy; 9, 12-octadecadienoic; 9, 12, 15-octadecatrienoic; 9, 11, 13-octadecatrienoic; 9, 11, 13-octadecatrienoic, 4-oxo; octadecatetrenoic; eicosanoic; 11-eicosenoic; eicosadienoic; eicosatrienoic; 5, 8, 11, 14-eicosatetraenoic; eicosapentaenoic; docosanoic; 13-docosenoic; docosatetraenoic; 4, 8, 12, 15, 19-docosapentaenoic; docosahexaenoic; tetracosenoic; and 4, 8, 12, 15, 18, 21-tetracosahexaenoic.

49. A method of making a joint assembly comprising:
positioning two structural panels adjacent each other so as to define a space therebetween; and,
filling the space with a jointing composition, said jointing composition including a sealant composition and a long chain ester having formula I, II, III, IV or a combination of any two or more of said esters in an amount of about 0.1% to about 15% by weight, based on the weight of the sealant composition in the jointing composition:

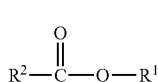

(I)

wherein $R^1$ is a $C_3$-$C_{24}$ alkyl radical, straight chain or branched, saturated or unsaturated containing 1 to 3 carbon-to-carbon double bonds; $R_2$ is a $C_3$-$C_{24}$ saturated fatty acid residue, or an unsaturated fatty acid residue having 1 to 6 carbon-to-carbon double bonds;

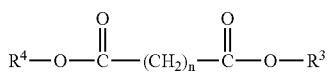

(II)

wherein n=324, and $R^3$ and $R^4$, same or different, are a $C_3$-$C_{24}$ alkyl radical, straight chain or branched, saturated or unsaturated containing 1 to 3 carbon-to-carbon double bonds;

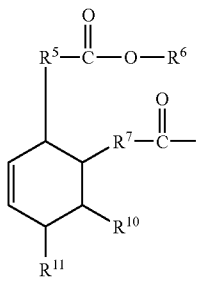

(III)

wherein $R^5$ and $R^7$, same or different, are a $C_3$-$C_{24}$ hydrocarbon chain, straight chain or branched, either saturated or having 1 to 6 carbon-to-carbon double bonds;

$R^6$ and $R^8$, same or different, are a $C_3$-$C_{24}$ alkyl radical, straight chain or branched, saturated or unsaturated containing 1 to 3 carbon-to-carbon double bonds; and $R^{10}$ and $R^{11}$, same or different, are a $C_3$-$C_{24}$ saturated hydrocarbon chain, straight chain or branched; or an unsaturated $C_3$-$C_{24}$ hydrocarbon chain, straight chain or branched, having 1 to 6, carbon-to-carbon double bonds;

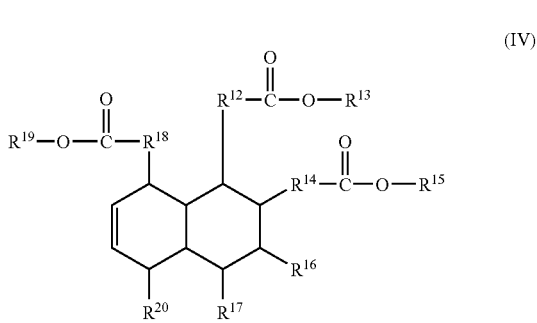

(IV)

wherein $R^{12}$, $R^{14}$ and $R^{18}$, same or different, are a $C_3$-$C_{24}$ hydrocarbon chain, straight chain or branched, either saturated or having 1 to 6 carbon-to-carbon double bonds;

$R^{13}$, $R^{15}$ and $R^{19}$, same or different, are a $C_3$-$C_{24}$ alkyl, straight chain or branched, saturated or unsaturated containing 1 to 3 carbon-to-carbon double bonds; and $R^{16}$, $R^{17}$ and $R^{20}$, same or different, are a $C_3$-$C_{24}$ saturated hydrocarbon chain, straight chain or branched; or unsaturated $C_3$-$C_{24}$ hydrocarbon chain, straight chain or branched, containing 1 to 6 carbon-to-carbon double bonds.

50. The method according to claim 49, wherein the jointing composition further includes an adhesive resin.

51. The method according to claim 49, wherein the adhesive resin is a condensation product of a methylene acceptor and a methylene donor.

52. The method according to claim 49, wherein the adhesive resin is a melamine-formaldehyde resin.

* * * * *

UNITED STATES PATENT AND TRADEMARK OFFICE
CERTIFICATE OF CORRECTION

PATENT NO. : 7,422,791 B2
APPLICATION NO. : 11/018790
DATED : September 9, 2008
INVENTOR(S) : Jerome M. Klosowski et al.

It is certified that error appears in the above-identified patent and that said Letters Patent is hereby corrected as shown below:

In the Claims:

At Column 23, line 18, "$R^{4,}$ same" should be -- $R^4$, same --.
At Column 23, line 33, "$R^{7,}$ same" should be -- $R^7$, same --.
At Column 23, line 57, "$R^{18,}$ same" should be -- $R^{18}$, same --.
At Column 23, line 60, "$R^{13,}$ $R^{15}$ and $R^{19,}$ same" should be -- $R^{13}$, $R^{15}$ and $R^{19}$, same --.
At Column 23, line 63, "$R^{16,}$ $R^{17}$ and $R^{20,}$ same" should be -- $R^{16}$, $R^{17}$ and $R^{20}$, same --.
At Column 24, line 23, "$R^{4,}$ same" should be -- $R^4$, same --.
At Column 24, line 41, "$R^{7,}$ are" should be -- $R^7$, same or different, are --.
At Column 24, line 45, "R6 and R8, same or different, are a C3-C18 alkyl" should be
-- $R^6$ and $R^8$, same or different, are a $C_3$-$C_{18}$ alkyl --.
At Column 24, line 48, "$R^{10}$ and $R^{11}$, same or different, are a $C_3$-$C_{18,}$ saturated" should be
-- $R^{10}$ and $R^{11}$, same or different, are a $C_3$-$C_{18}$, saturated --.
At Column 25, line 1, "and $R^{18,}$ same or different, are a $C_8$–$C_8$" should be
-- and $R^{18}$, same or different, are a $C_8$-$C_{18}$ --.
At Column 25, line 9, "$R^{16,}$ $R^{17}$ and $R^{20,}$ same" should be -- $R^{16}$, $R^{17}$ and $R^{20}$, same --.
At Column 25, line 11, "unsaturated $C_6$-$C_{15}$ hydrocarbon" should be
-- unsaturated $C_6$-$C_{18}$ hydrocarbon --.
At Column 26, line 38, "$CH_2=C(R^2)$—C(O)—O—," should be -- $CH_2=C(R^2)$—C(O)—O—, --.
At Column 26, line 40, "$CH_2=C(R^2)$—C(O)—Z," should be -- $CH_2=C(R^2)$—C(O)—Z, --.
At Column 26, line 42, "$CH_2=C(R^2)$—C(O)—NH—, and" should be
-- $CH_2=C(R^2)$—C(O)—NH—, and --.
At Column 26, line 44, "$CH_2=C(R^2)$—$CH_2$—0—," should be
-- $CH_2=C(R^2)$—$CH_2$—O—, --.
At Column 26, line 45, "or $C_1$-$C^{18}$ alkyl" should be -- or $C_1$-$C_{18}$ alkyl --.
At Column 26, line 54, "—O—$CH(C_2H_5)$—0—, and" should be
-- —O—$CH(C_2H_5)$—O—, and --.
At Column 26, line 59, "—NH—C(O)—$OR^{4,}$and" should be -- —NH—C(O)—$OR^4$, and --.
At Column 26, line 61, "—NH—C(O)—$R^{4,}$and" should be -- —NH—C(O)—$R^4$, and --.
At Column 26, line 62, "hydrogen or $R_{4,}$ and $R_4$ is" should be --hydrogen or $R^4$, and $R^4$ is --.

Signed and Sealed this

Fourteenth Day of September, 2010

David J. Kappos
*Director of the United States Patent and Trademark Office*

At Column 27, line 35, "$CH_2\text{=}C(CH_3)$—$C(O)O$—$C_3H_6$—$O$—$CH_2\_$" should be
-- $CH_2=C(CH_3)$ —$C(O)O$—$C_3H_6$—$O$—$CH_2$— --.
At Column 27, lines 38-41, "$CH_2\text{=}CH_2$—$C(O)O$—$C_2H_4$—$0$—$CH_2$—$_{\text{and at least one R}}$ radical is selected from" should be
-- $CH_2=CH_2$—$C(O)O$—$C_2H_4$—$O$—$CH_2$— and at least one R radical is selected from --.
At Column 27, line 44, "$_{\text{and}}$" should be -- and --.
At Column 27, line 46, "—$CH_2$—$NH$—$C(O)$ —$0$—$C_3H_7$." should be
-- —$CH_2$—$NH$—$C(O)$ —$O$—$C_3H_7$. --.
At Column 28, line 52, "a $C_{3-24}$ alcohol" should be -- a $C_3$-$C_{24}$ alcohol --.
At Column 29, line 15-22, " 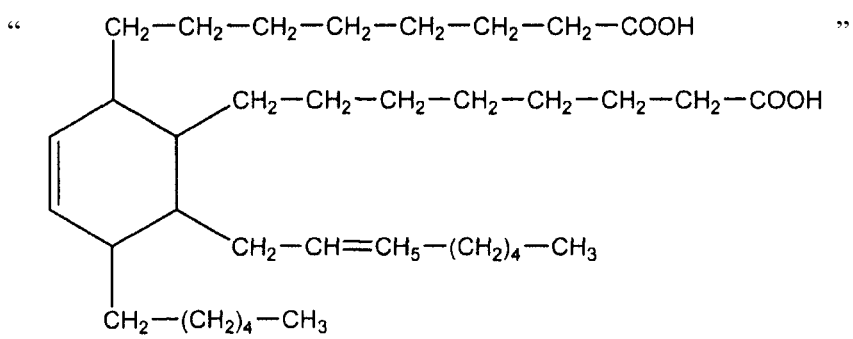 "

should be

-- 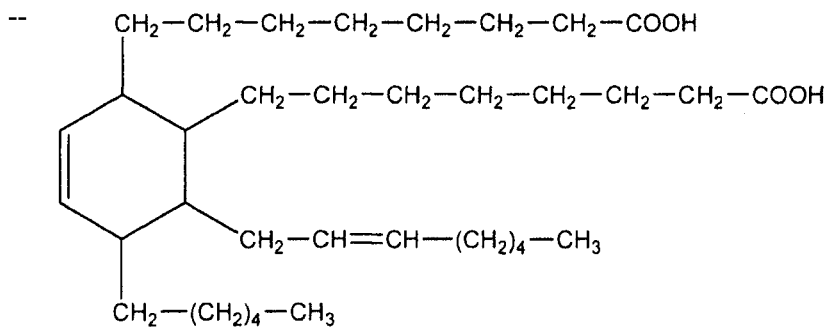 --.

At Column 30, line 34, "$R^{12}R^{14}$ are" should be -- $R^{12}$, $R^{14}$ are --.
At Column 30, line 38, "pilehard" should be -- pilchard --.
At Column 31, line 18, "bonds; $R_2$ is" should be -- bonds; $R^2$ is --.
At Column 31, line 28, "n==324, and $R^3$ and $R^{4,}$ same" should be
-- n=3-24, and $R^3$ and $R^4$, same --.
At Column 31, line 29, "$C_3$-$C_{24}$alkyl" should be -- $C_3$-$C_{24}$ alkyl --.
At Column 32, line 1, "$R^{7,}$ same" should be -- $R^7$, same --.
At Column 32, line 4, "$R^{8,}$ same" should be -- $R^8$, same --.
At Column 32, line 10, "to 6, carbon" should be -- to 6 carbon --.
At Column 32, line 26, "$R^{18,}$ same" should be -- $R^{18}$, same --.
At Column 32, line 33, "$R^{20,}$ same" should be -- $R^{20}$, same --.